United States Patent [19]

deVos et al.

[11] Patent Number: 5,301,005

[45] Date of Patent: Apr. 5, 1994

[54] METHOD AND APPARATUS FOR DETERMINING THE POSITION OF A RETROREFLECTIVE ELEMENT

[75] Inventors: Leon B. C. deVos, Huber Heights; James A. Schneider, Verona, both of Ohio

[73] Assignee: Spectra-Physics Laserplane, Inc., Dayton, Ohio

[21] Appl. No.: 15,816

[22] Filed: Feb. 10, 1993

[51] Int. Cl.$^5$ .................. G01B 11/26; G01C 3/00
[52] U.S. Cl. .................................. 356/141; 356/1; 356/152
[58] Field of Search .................. 356/1, 141, 152

[56] References Cited

U.S. PATENT DOCUMENTS

| | | | |
|---|---|---|---|
| 3,898,445 | 8/1975 | MacLeod et al. | 356/141 |
| 3,923,402 | 12/1975 | Turcotte | 356/152 |
| 4,113,381 | 9/1978 | Epstein | 356/5 |
| 4,568,182 | 2/1986 | Modjallal | 356/1 |
| 4,715,714 | 12/1987 | Gaechter et al. | 356/375 |
| 4,796,198 | 1/1989 | Boultinghouse et al. | 180/169 |
| 4,830,489 | 5/1989 | Cain et al. | 356/152 |
| 4,918,607 | 4/1990 | Wible | 180/169 |
| 5,076,690 | 12/1992 | deVos et al. | 356/152 |
| 5,110,202 | 5/1992 | Dorbusch et al. | 356/1 |
| 5,137,354 | 8/1992 | deVos et al. | 356/152 |

Primary Examiner—Stephen C. Buczinski
Attorney, Agent, or Firm—Killworth, Gottman, Hagan & Schaeff

[57] ABSTRACT

A method and system for determining the position of at least one position retroreflective element in a predetermined frame of reference using two benchmark positions of known coordinates. A light transmitting and detecting means and a reference retroreflective element are oppositely positioned at a primary benchmark position located at known first coordinates and a secondary benchmark position located at known second coordinates. The light transmitting and detecting means takes angular measurements by sensing a reflected light beam from the position and reference retroreflective elements. After taking angular measurements in the above configuration, the light transmitting and detecting means and the reference retroreflective element are transposed and additional angular measurements are taken. From the angular measurements, the position of the position retroreflective element is determined in the coordinate frame of reference. In addition, the light transmitting and detecting means may be further positioned at an intermediate benchmark position having unknown coordinates. After determining the coordinates of the intermediate benchmark position, angular measurements taken at the intermediate benchmark position are compared with the angular measurements from the primary and secondary benchmark positions and the most accurate measurements are used to determine the position of at least one position retroreflective element.

23 Claims, 4 Drawing Sheets

METHOD AND APPARATUS FOR DETERMINING THE POSITION OF A RETROREFLECTIVE ELEMENT

BACKGROUND OF THE INVENTION

The present invention relates generally to laser-based position sensing systems useful in construction applications and, more particularly, to a method and system for determining the position of a retroreflective element in a predetermined frame of reference and for providing this position to a position sensing system for use in subsequently determining the position of any point in the predetermined frame of reference.

In the construction industry, the level of automation and robotization continues to remain very low. A significant reason for this is the difficulty of properly positioning machines and tools. In the construction of commercial buildings, for example, various points of reference have to be established, such as placement of floors, ceilings, electrical wiring, plumbing, and heating and cooling ducts. Establishing reference points is time consuming and expensive, particularly as such work is often contracted out to companies which specialize in this work.

Various laser-based position sensing systems are known which continually track the position of a reference point in a predetermined frame of reference. For example, commonly assigned U.S. Pat. No. 5,076,690 discloses a position sensing system which calculates the X-Y coordinates of a point using triangulation and determines the direction in which the point is moving. The triangulation calculation is based on the known coordinates of at least three retroreflective elements spaced apart from each other around the periphery of a two-dimensional coordinate frame, and the measured angles between the lines projected radially outward from the point to each of the retroreflective elements. The accuracy of the measured angles is achieved by using a rotating member supported by dedicated hardware and controlled by software. The member rotates with a beam of light generated by a light transmitting and detecting device positionable at the point. The light transmitting and detecting device receives the beam of light reflected back from the retroreflective elements and generates an output signal in response thereto. A computer processes the output signals for use in calculating the X-Y position of the point and the orientation of the light transmitting and detecting device when it is positioned at the point.

The precision of a position sensing system as just described is highly dependent on the ability of the operator to measure the coordinates of the three retroreflective elements accurately. Moreover, each of the respective coordinates of the retroreflective elements must be measured and entered into the computer of the system. Miscalculation of, or errors in entering, the positions of the retroreflective elements could result in time consuming and expensive removal and repositioning of various building fixtures, such as walls, plumbing and heating and cooling ducts.

Consequently, in view of the shortcomings of the above laser-based position sensing system, there is a need for a method and system for easily and accurately determining the position coordinates of the retroreflective elements while concomitantly reducing the likelihood of operator error.

SUMMARY OF THE INVENTION

This need is met by the method and system of the present invention which accurately determines the positions of any number of position retroreflective elements from the known coordinates of two benchmark positions. A light transmitting and detecting means and a reference retroreflective element are positioned at a primary benchmark position located at known first coordinates and a secondary benchmark position located at known second coordinates, respectively. The light transmitting and detecting means takes angular measurements by sensing a reflected light beam from the position and reference retroreflective elements. After taking angular measurements in the above configuration, the light transmitting and detecting means and the reference retroreflective element are transposed and additional angular measurements are taken. From the angular measurements, the position of the position retroreflective element is determined in the coordinate frame of reference.

In accordance with one aspect of the present invention, the method for determining the position of at least one position retroreflective element located in a predetermined coordinate frame of reference having an X axis comprises the steps of: (a) providing a light transmitting and detecting means capable of transmitting a rotating beam of light, detecting reflections of the beam of light, providing an index position along the rotation of the beam of light, and providing a reference position which is parallel to said X axis irrespective of the orientation of said light transmitting and detecting means; (b) providing a reference retroreflective element capable of reflecting the beam of light back toward the light transmitting and detecting means; (c) positioning the light transmitting and detecting means at a primary benchmark position at known first coordinates in the coordinate frame of reference; (d) positioning the reference retroreflective element at a secondary benchmark position at known second coordinates in the coordinate frame of reference; (e) transmitting the beam of light to illuminate the at least one position retroreflective element and the reference retroreflective element during a first rotation of the beam of light; (f) monitoring the first rotation of the beam of light as it travels between the index position, the at least one position retroreflective element and the reference retroreflective element; (g) repositioning the light transmitting and detecting means at the second benchmark position and the reference retroreflective element at the primary benchmark position; (h) transmitting the beam of light to illuminate the at least one position retroreflective element and the reference retroreflective element during a second rotation of the beam of light; (i) monitoring the second rotation of the beam of light as it travels between the index position, the at least one position retroreflective element and the reference retroreflective element; and (j) determining the position of the at least one position retroreflective element in the coordinate system based on the first coordinates, the second coordinates, the reference position and the first and second rotations of the beam of light.

Preferably, the steps of monitoring the first and second rotations of the beam of light further include the steps of: mounting a member on a rotating shaft, the member having a periphery and further having a plurality of apertures located at the periphery which divide a revolution of the member into a plurality of generally equal partial revolutions; and registering a time differential between each adjacent pair of the plurality of apertures as the member rotates. The step of interpolating between the each adjacent pair of the plurality of apertures may be provided to determine exact angles between each of the adjacent pair of the plurality of apertures.

In accordance with another aspect of the present invention, the method for determining the position of at least one position retroreflective element located in a predetermined coordinate frame of reference having an X axis comprises the steps of: (a) providing a light transmitting and detecting means capable of transmitting a rotating beam of light, detecting reflections of the beam of light, providing an index position along the rotation of the beam of light, and providing a reference position parallel to said X axis irrespective of said orientation of said light transmitting and detecting means; (b) providing a reference retroreflective element capable of reflecting the beam of light back toward the light transmitting and detecting means; (c) providing an intermediate benchmark position located at third coordinates; (d) positioning the light transmitting and detecting means at a primary benchmark position at known first coordinates in the coordinate frame of reference; (e) positioning the reference retroreflective element at a secondary benchmark position at known second coordinates in the coordinate frame of reference; (f) transmitting the beam of light to illuminate the at least one position retroreflective element and the reference retroreflective element during a first rotation of the beam of light; (g) monitoring the first rotation of the beam of light as it travels between the index position, the at least one position retroreflective element and the reference retroreflective element; (h) repositioning the reference retroreflective element at an intermediate benchmark position; (i) transmitting the beam of light to illuminate the at least one position retroreflective element and the reference retroreflective element during a second rotation of the beam of light; (j) monitoring the second rotation of the beam of light as it travels between the index position, the at least one position retroreflective element and the reference retroreflective element; (k) repositioning the light transmitting and detecting means at the secondary benchmark position; (1) transmitting the beam of light to illuminate the at least one position retroreflective element and the reference retroreflective element during a third rotation of the beam of light; (m) monitoring the third rotation of the beam of light as it travels between the index position, the at least one position retroreflective element and the reference retroreflective element; (n) repositioning the reference retroreflective element at the primary benchmark position; (o) transmitting the beam of light to illuminate the at least one position retroreflective element and the reference retroreflective element during a fourth rotation of the beam of light; (p) monitoring the fourth rotation of the beam of light as it travels between the index position, the at least one position retroreflective element and the reference retroreflective element; (q) repositioning the light transmitting and detecting means at the intermediate benchmark position; (r) transmitting the beam of light to illuminate the at least one position retroreflective element and the reference retroreflective element during a fifth rotation of the beam of light; (s) monitoring the fifth rotation of the beam of light as it travels between the index position, the at least one position retroreflective element and the reference retroreflective element; and (t) determining the position of the at least one position retroreflective element in the coordinate system based on the reference position, the first and second coordinates and at least two of the first, second, third, fourth, and fifth rotations of the beam of light.

The step of determining the position of the at least one position retroreflective element may preferably include the steps of: calculating at least two X coordinate values and at least two Y coordinate values for the at least one position retroreflective element based on the reference position, the first, second, and third coordinates and the first, second, third, fourth and fifth rotations of the beam of light; comparing the at least two X coordinate values to determine a most accurate X coordinate value; comparing the at least two Y coordinate values to determine a most accurate Y coordinate value; and using the most accurate X coordinate value and the most accurate Y coordinate value as the coordinates of the at least one position retroreflective element.

In another embodiment of the present invention, the step of determining the position of the at least one position retroreflective element includes the steps of: (t) calculating a X coordinate value and a Y coordinate value for the at least one position retroreflective element based on the reference position, the first, second and third coordinates and at least two of the first, second, third, fourth and fifth rotation of the beam of light; (u) setting a maximum X derivative value; (v) setting a maximum Y derivative value; (x) calculating a derivative of the calculated X coordinate value to produce a X derivative value; (y) calculating a derivative of the calculated Y coordinate value to produce a Y derivative value; (z) comparing the X derivative value to the maximum X derivative value; (aa) comparing the Y derivative value to the maximum Y derivative value; (bb) using the calculated X coordinate value as the X coordinate of the at least one position retroreflective element if the X derivative value is less than the maximum X derivative value; (cc) using the calculated Y coordinate value as the Y coordinate of the at least one position retroreflective element if the Y derivative value is less than the maximum Y derivative value; (dd) repeating steps (t) through (cc) using the at least two of the first, second, third, fourth and fifth rotation of the beam of light until a X derivative value and a Y derivative value are less than the maximum X derivative value and the maximum Y derivative value respectively.

Preferably, the position of the position retroreflective element of the present invention is used to initialize a light transmitting and detecting means which typically uses at least three retroreflective elements at known locations to determine the position of any point in a given frame of reference.

In accordance with yet another aspect of the present invention, a system for determining the position of at least one position retroreflective element in a predetermined coordinate frame of reference having an X axis is provided. A light transmitting and detecting means, which is positioned at a first benchmark position of known first coordinates and, subsequently, at a second benchmark position at known second coordinates, provides a rotating beam of light which is reflected from a reference retroreflective element and the at least one position retroreflective element. The light transmitting and detecting means further provides an index position along the rotation of the beam of light and a reference position which is parallel to the X axis irrespective of the orientation of the light transmitting and detecting means such that angular measurements may be referenced thereto. A computer means computes the position of the at least one position retroreflective element in the frame of reference from the rotations of the beam of light at the respective positions of the light transmitting and detecting means.

Preferably, the position retroreflective element includes an identification means thereon for reflecting light which includes information generated by the identification means for uniquely identifying a particular position retroreflective element. Additionally, the light transmitting and detecting means may be comprised of means for generating a beam of light, means for projecting the beam of light at a substantially constant rotating angular velocity toward the at least one position retroreflective element and the reference retroreflective element, means for receiving the beam of light reflected from the at least one position retroreflective element and the reference retroreflective element corresponding to the illumination of each of the retroreflective elements during the rotation of the beam, and means for transmitting a plurality of angle signals indicative of a plurality of angles at which the means for receiving the beam of light is positioned with respect to the index position, the at least one position retroreflective element and the reference retroreflective element.

It is thus an object of the present invention to provide a method and system for determining the position of at least one position retroreflective element in a given frame of reference which eliminates the need for manually measuring the location of each position retroreflective element, provides improved accuracy over manual surveying techniques and reduces the possibility of operator error. Other objects and advantageous of the invention will be apparent from the following description, the accompanying drawings and the appended claims.

BRIEF DESCRIPTION OF THE DRAWINGS

In order that the invention may be more readily understood, reference will now be made to the accompanying drawings, in which.

DETAILED DESCRIPTION OF THE PREFERRED EMBODIMENT

Figure 1A:
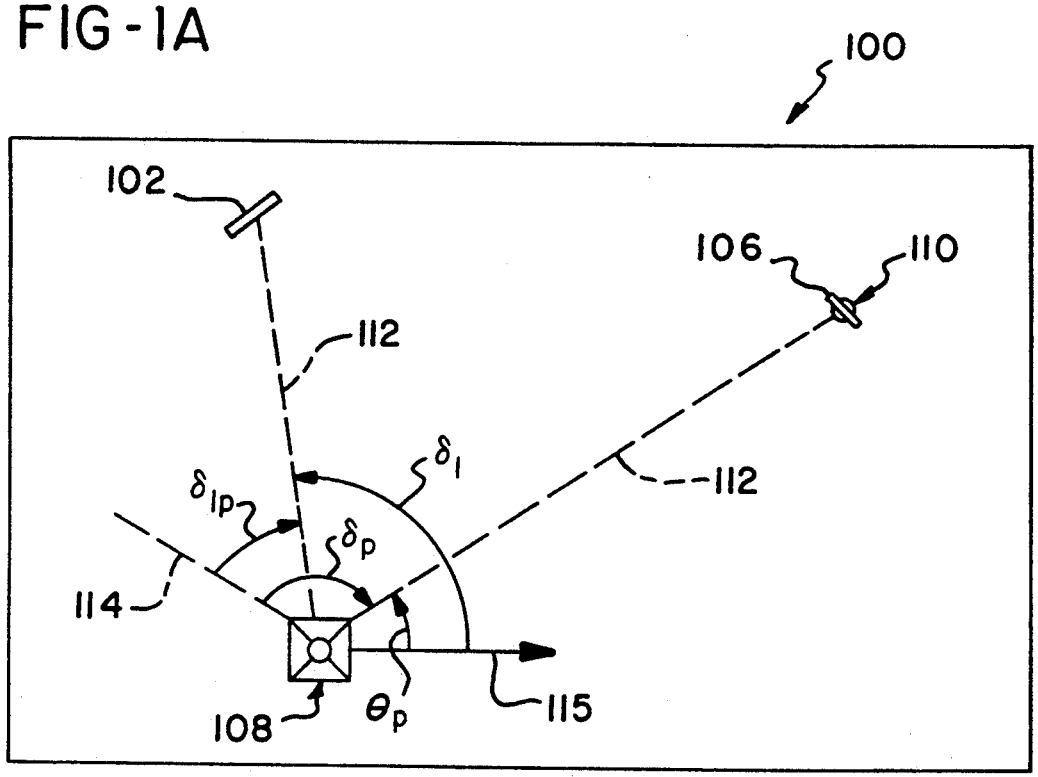
FIGS. 1A and 1B are top plan views of a structured environment defined by four intersecting walls and including primary and secondary benchmark positions at known coordinates, a light transmitting and detecting means, a retroreflective element and a position retroreflective element in which the method and system of the present invention may be advantageously applied.

The method and system of the present invention are advantageously utilized in either a structured environment 100, as shown in FIGS. 1A to 2B, or an external environment, to determine the coordinate position of a position retroreflective element 102 in a given coordinate frame of reference. In FIG. 1A, light transmitting and detecting means 104, best illustrated in FIG. 3, and a reference retroreflective element 106 are shown positioned at a primary benchmark position 108 located at known first coordinates and a secondary benchmark position 110 located at known second coordinates, respectively. A light beam 112, generated by the light transmitting and detecting means 104, strikes each of the retroreflective elements 102 and 106 producing reflections of the beam 112 which are detected by the light transmitting and detecting means 104. After taking angular measurements in the above configuration, the light transmitting and detecting means 104 and the reference retroreflective element 106 are transposed, as shown in FIG. 1B, and additional angular measurements are taken. From the angular measurements, the position of the position retroreflective element 102 is determined in the coordinate frame of reference.

Position sensing systems using a light transmitting and detecting means in which the present invention may be advantageously employed are known in the art. For example, such a system is disclosed in commonly assigned U.S. Pat. No. 5,076,690 which is incorporated herein by reference. A brief description of such a light transmitting and detecting means 104 will now be given with reference to FIGS. 3 through 6.

Figure 3:
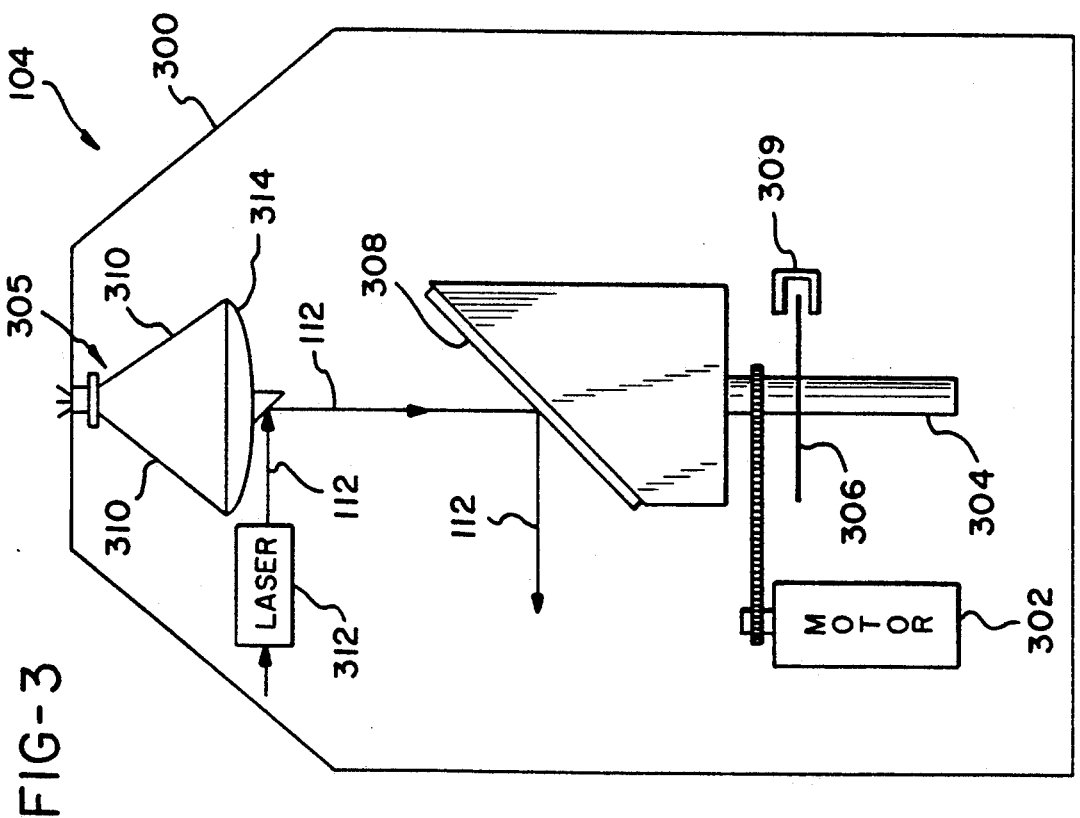
FIG. 3 is a side view, with parts broken away, of a light transmitting and detecting means of a laser-based positioning system.

Referring now to FIG. 3, a side diagrammatic view of a housing 300 containing the light transmitting and detecting means 104 is shown. The light transmitting and detecting means 104 includes an electric motor 302 mounted to rotate a shaft 304. A member 306, such as a code wheel, and a light diverting mirror 308 are mounted on the shaft 304. As described more fully below, a member pick up element 309 detects the rotation of the member 306. Member pick up element 309 further detects an index element, shown as 402 in FIG. 4, and produces a single reference pulse indicating an index position, shown as line 114 in FIGS. 1A and 1B, along the rotation of the beam of light 112 in response thereto. As one skilled in the art will appreciate, index element 402 may be of any configuration which produces a reference pulse that is distinguishable from signals produced by pick up elements 400. A light source, such as solid state laser 312, directs the beam of light 112 onto the rotating mirror 308 so that a plane of rotation is created.

Figure 5:
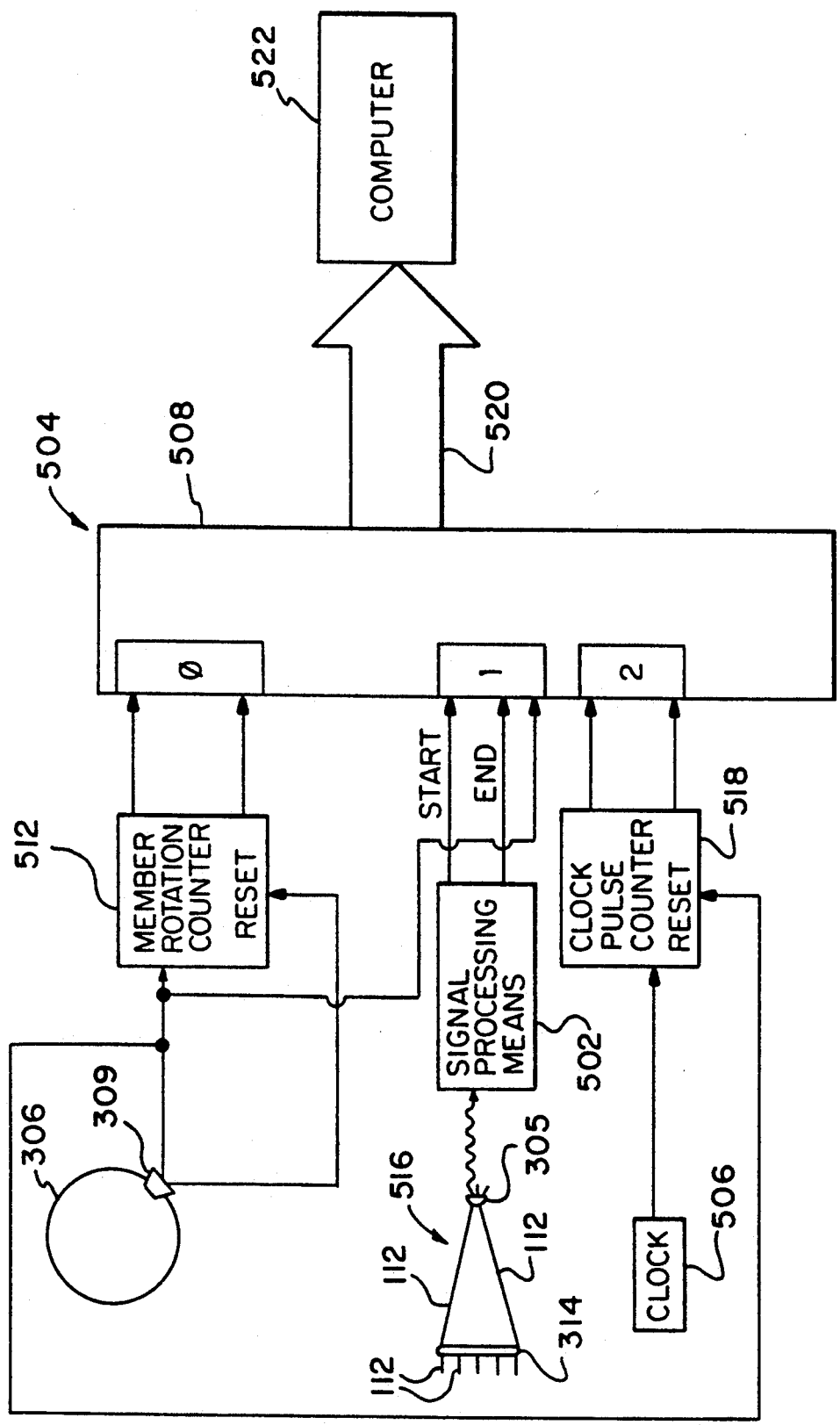
FIG. 5 is a schematic block diagram of a hardware interface, controlled by software, which supports the initializing system of the present invention.

When the rotating laser beam 112 strikes the retroreflective elements 102 and 106 during a revolution of the shaft 304, the beam of light 112 is reflected back to the light transmitting and detecting means 104 and is transformed into an analog signal by a suitable detector, such as photodetector 305, and transmitted to a signal processing means 502 of FIG. 5, which outputs two digital signals. The light transmitting and detecting means 104 may include means for diverting and focusing 310 the returning beam to the photodetector 305. In FIG. 3, the rotating mirror 308 diverts the light beam 112 toward a collimating lens 314, which lens 314 focuses the light beam 112 toward the photodetector 305.

Figure 4:
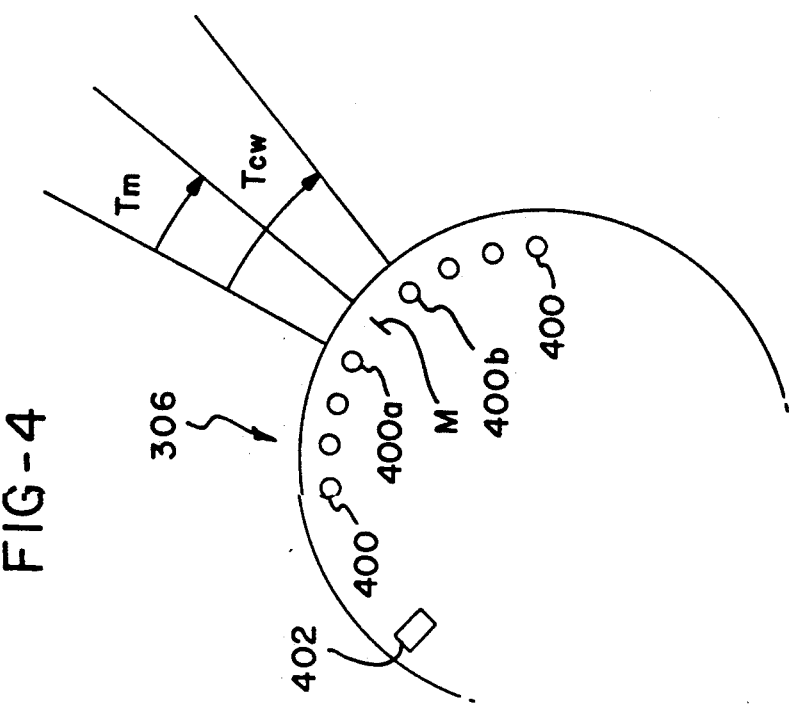
FIG. 4 is an exploded partial top view of a rotating member illustrated in FIG. 3.

As shown in FIG. 4, the member or code wheel 306 has a plurality of angularly positioned elements, preferably apertures 400, spaced around its periphery which divide a revolution of the member 306 into a plurality of generally equal partial revolutions. The index element 402, as previously described, provides an indication of the index position 114. The size and spacing of these apertures are greatly exaggerated in the drawing for clarity of illustration. For example, the code wheel 306 may divide a revolution into one thousand generally equal parts positioned approximately 0.36 degrees apart by spacing one thousand elements or apertures 400 around the periphery of the member 306.

Preferably, angles between pairs of adjacent, such as 400a and 400b, are measured to a great degree of precision. This information is then stored in computer 522. Therefore, even though the spacings between apertures are not exactly equal, it is possible to make accurate angular measurements with the laser-based positioning system. Interpolation is used for angular measurements that fall between apertures too. Since any speed fluctuation of the motor 302 between two adjacent apertures 400, particularly when there are one thousand such apertures spaced around the periphery of the member 306, will be negligible, it is possible to interpolate between an adjacent pair of apertures to determine an exact angle of a point M between the pair of apertures 400a and 400b, according to the equation $$\text{Angle} = <400a + (Tm/Tcw)*(<400b - <400a)$$

where $<400a$ is the measured angle between the index position 114 and the aperture 400a; Tm is the time elapsed between passage of the previous aperture, here aperture 400a, and the moment M in time that the reflecting light strikes the sensor or photodetector 305; and Tcw is the time it takes the code wheel 306 to move between element 400a and element 400b.

The position sensing system which combines the use of the code wheel 306 and the motor 302 is supported by a hardware interface 504, illustrated in FIG. 5. An event occurs every time an aperture 400 on the code wheel 306 passes, or a retroreflective element commences or ends a reflection of the beam of light 112. Due to the high precision time measurements required between each adjacent pair of apertures 400, a reference clock 506 is used in keeping a record of an event. If an event occurred during this time, it is stored in a circuit 508, such as a 16 bit first-in-first-out circuit. The circuit 508 records the movement of the code wheel 306 at register 0. The actual element or aperture 400 which is currently passing is sensed at the member or code wheel pick up element 309 and counted by a member rotation counter 512. Each time the member 306 has completed a full rotation, the member pick up element 309, in response to the index element 402, sends an index position signal to reset the member rotation counter 512. The member pick up element 309 comprises means for detecting movement of each of the elements 400 past a predetermined point as the member 306 rotates. In a preferred embodiment of the present invention, the pick up element 309 comprises a light source paired with a photodetector element.

Signal processing means 502 detects when receiving optics 516, consisting of collimating lens 314 and photodetector 305, is either commencing receipt of the reflection of the light beam 112 or ending receipt of the reflection of the light beam 112 from a retroreflective element to the light transmitting and detecting means 104. Signal processing means 502 can transform the analog signal from photodetector 305 into two digital signals which are received at register 1 of circuit 508. The first digital signal represents a START signal which indicates that the reflection from a retroreflective element is commencing the reflection of beam 112 from the retroreflective element to the light transmitting and detecting means 104, and the second digital signal is an END signal which indicates that the reflection is ending.

Alternatively, the signal processing means 502 digitizes the analog signal from photodetector 305. The digital signal is then analyzed to determine when a reflection of the beam 112 from a retroreflective element is starting and when the reflection is ending. Such analysis may include indicating successive start and end signals as the digital signal exceeds and falls below a certain value.

Referring again to FIG. 5, register 2 receives signals for measuring the time elapsing between the passage of the last aperture 400 and an event, which event may be the time Tm or the time Tcw shown in FIG. 4. A clock pulse counter 518 is reset at every passage of an aperture 400 as detected by the element 309 and, consequently, the counter 518 counts the time elapsing between each pair of adjacent elements 400.

The circuit 508 stores the information received and provides an output signal 520 to the computer 522 which includes a microprocessor having memory means. The computer 522 is responsive to the output signal 520 and computes the coordinates of the position retroreflective element 102 in the coordinate frame of reference 100. After determining the position of at least three retroreflective elements, the computer 522 can compute the position of the light transmitting and detecting means 104 at any point in the frame of reference. It will be apparent to one skilled in the art that the position of any position retroreflective element can be determined either by the method of the present invention or by conventional surveying techniques.

Preferably, an identification means, such as a conventional bar code pattern, is located on the face of the retroreflective elements. The identification means provides information in the light reflected from the retroreflective element such that the computer 522 can uniquely identify each retroreflective element.

The method for determining the position of a position retroreflective element in a predetermined coordinate frame of reference using the primary and secondary benchmark positions 108 and 110 in accordance with the present invention will now be described with reference to FIGS. 1A and 1B. Initially, the coordinate positions of the primary benchmark position 108, hereinafter designated as PX and PY, and the secondary benchmark position 110, hereinafter designated as SX and SY, are determined, for example, by conventional surveying techniques. By using these coordinates, the present invention can determine the position of one or more retroreflective elements in the frame of reference. The coordinates are entered into the computer 522, having a microprocessor (not shown), such as a Motorola 68332. Appropriate software for controlling the above described hardware in accordance with the present invention is stored in memory associated with the microprocessor. An exemplary listing of the software is provided below.

As shown in FIG. 1A, the light transmitting and detecting means 104 is positioned at the primary benchmark position 108 and the reference retroreflective element 106 is positioned at the secondary benchmark position 110. The rotating beam of light 112 illuminates the position retroreflective element 102 and the reference retroreflective element 106. A first angle $\gamma_p$ between the index position 114, generated by the index element 402, and the reference retroreflective element 106, located at the second benchmark position 110, and a second angle $\gamma_{1p}$ between the index position 114 and the position retroreflective element 102 are measured by detecting the reflected light beam 112 from each of the respective retroreflective elements 102 and 106 during a rotation of the light beam 112.

The computer 522 initially establishes, based on the given coordinates of the primary and secondary benchmark positions 108 and 110, a coordinate frame of reference. From the coordinate frame of reference, the computer 522 continually calculates a reference position, shown as a reference line 115 in FIGS. 1A through 2B, which is always parallel to the X axis of the coordinate frame of reference, irrespective of the position of the light transmitting and detecting means 104. A primary-secondary axis angle $\theta_p$ is then calculated by the computer 522 relative to the reference line 115.

Figure 1B:
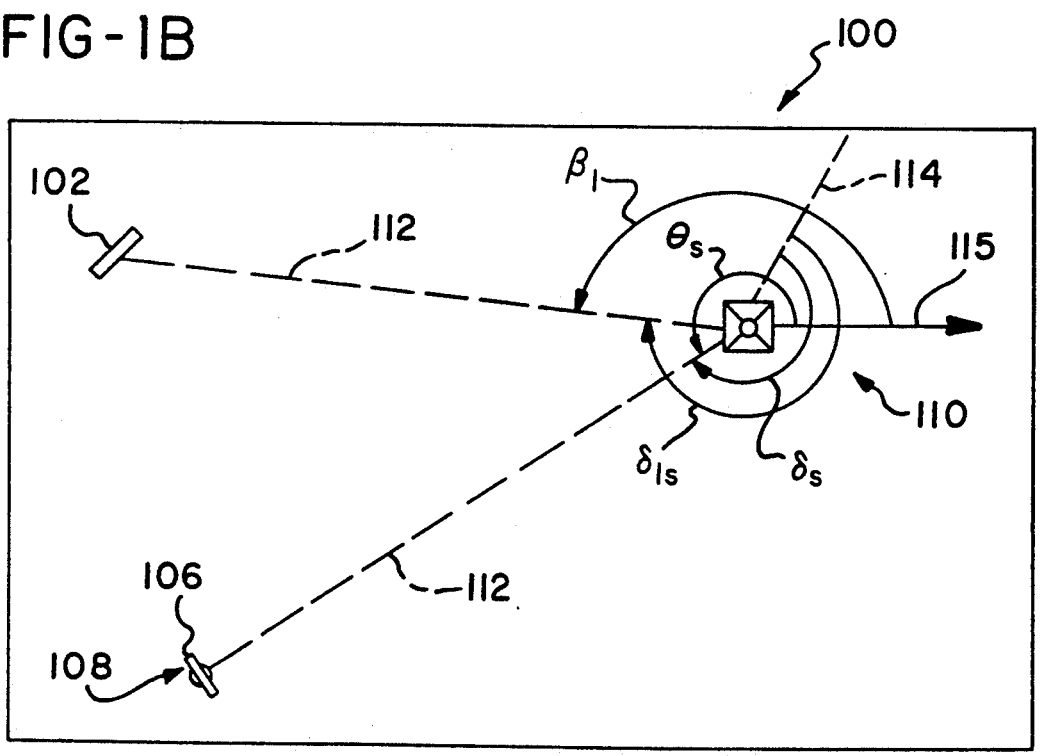

The light transmitting and detecting means 104 is then repositioned at the secondary benchmark position 110 and the reference retroreflective element 106 is repositioned at the primary benchmark position 108, as shown in FIG. 1B. The light beam 112 is again rotated to illuminate the position retroreflective element 102 and the reference retroreflective element 106. A third angle $\gamma_s$ between the index position 114 and the reference retroreflective element 106, located at the first benchmark position 108, and a fourth angle $\gamma_{1s}$ between the index position 114 and the position retroreflective element 102 are then measured based on the detected reflections of the light beam 112. A secondary-primary axis angle $\theta_s$ is then determined by the computer 522 relative to the reference line 115 which is parallel to the X axis of the coordinate frame of reference. Based on the known first coordinates, PX and PY, and the known second coordinates, SX and SY, of the respective primary and secondary benchmark positions 108 and 110 and the measured angles to the respective retroreflective elements, the position of the position retroreflective element 102 in the predetermined coordinate frame of reference 100 is determined and stored by the computer 522.

Although the above description is directed to determining the position of a single position retroreflective element 102, it is readily apparent to one skilled in the art that the position of more than one retroreflective element can be determined by the present invention. As noted above, each retroreflective element may have an identification means thereon which produces a reflected light beam having characteristics unique to the particular retroreflective element. Consequently, the computer means 522 can distinguish between each retroreflective element and calculate their positions separately in accordance with the method of the present invention.

In a preferred embodiment of the present invention, the X and Y coordinates of the position retroreflective element 102 are measured by determining a first benchmark angle $\alpha 1$ between the position retroreflective element 102 and the reference line 115, as measured from the primary benchmark position 108. The first benchmark angle $\alpha 1$ may be calculated according to the following equation:

$$\alpha 1 = \theta_p + \gamma_p - \gamma_{1p} \qquad (1)$$

wherein $\gamma_p$ is the first angle between the index position 114 and the position retroreflective element 102, $\gamma_{1p}$ is the second angle between the index position 114 and the secondary benchmark position 110, and $\theta_p$ is the primary-secondary axis angle between the reference line 115 and the secondary benchmark 110.

Similarly, a second benchmark angle $\beta 1$ between the position retroreflective element 102 and the reference line 115 may be calculated according to the following equation:

$$\beta 1 = \theta_s + \gamma_s - \gamma_{1s} \qquad (2)$$

wherein $\gamma_s$ is the third angle between the index position 114 and the reference retroreflective element 106, located at the primary benchmark position 108, $\gamma_{1s}$ is the fourth angle between the index position 114 and the position retroreflective element 102 and $\theta_s$ is the second reference angle between the reference line 115 and the secondary benchmark position 108.

The X and Y coordinate values of the position retroreflective element 102 are then calculated from the first benchmark angle $\alpha 1$, the second benchmark angle $\beta 1$ and the known coordinates of the respective benchmark positions PX, PY, SX and SY. The X coordinate value of the position retroreflective element 102 may preferably be calculated by solving the following equation:

$$T_x = \frac{SY - (\tan \beta 1 * SX) - PY + (\tan \alpha 1 * PX)}{\tan \alpha 1 - \tan \beta 1} \qquad (3)$$

The Y coordinate value may be determined using $\alpha 1$ by solving the following equation:

$$T_{YA} = PY - \tan \alpha 1 * (PX - T_X) \qquad (4)$$

and using $\beta 1$ by solving the following equation:

$$T_{YB} = SY - \tan \beta 1 * (SX - T_X) \qquad (5)$$

In addition to calculating the X and Y coordinates of the position retroreflective element 102, the following derivatives are also calculated.

$$\frac{dx}{d\alpha 1} = \frac{(1 + \tan^2 \alpha 1) * (PY - SY + (\tan \beta 1 * (SX - PX)))}{(\tan \alpha 1 - \tan \beta 1)^2} \qquad (6)$$

$$\frac{dx}{d\beta 1} = \frac{(1 + \tan^2 \beta 1) * (SY - PY + (\tan \alpha 1 * (PX - SX)))}{(\tan \alpha 1 - \tan \beta 1)^2} \qquad (7)$$

$$\frac{dy}{d\alpha 1} = (1 + \tan^2 \alpha 1) * (T_x - PX) + \tan \alpha 1 * \frac{dx}{d\alpha 1} \qquad (8)$$

$$\frac{dy}{d\beta 1} = (1 + \tan^2 \beta 1) * (T_x - SX) + \tan \beta 1 * \frac{dx}{d\beta 1} \qquad (9)$$

$$\frac{dx}{d_{TOT}} = \sqrt{\left(\frac{dx}{d\alpha 1}\right)^2 + \left(\frac{dx}{d\beta 1}\right)^2} \qquad (10)$$

The computer 522 then uses the following criteria to determine which set of calculated coordinates for the position retroreflective element 102 provides the best accuracy.

A. If $dx/d_{TOT} < dx$, then $T_X$ is stored as the X coordinate for the position retroreflective element 102 and $dx/d_{TOT}$ is stored as $dx$.

B. If $dy/d\alpha 1 < dy$, then $T_{YA}$ is stored as the Y coordinate for the position retroreflective element 102 and $|dy/d\alpha 1|$ is stored as $dy$.

C. If $dy/d\beta 1 < dy$, then $T_{YB}$ is stored as the Y coordinate for the position retroreflective element 102 and $|dy/d\beta 1|$ is stored as $dy$.

Thus, by using the aforementioned criteria, the present invention assures that the most accurate measured X and Y coordinates of the position retroreflective element 102 are used.

Figure 2A:
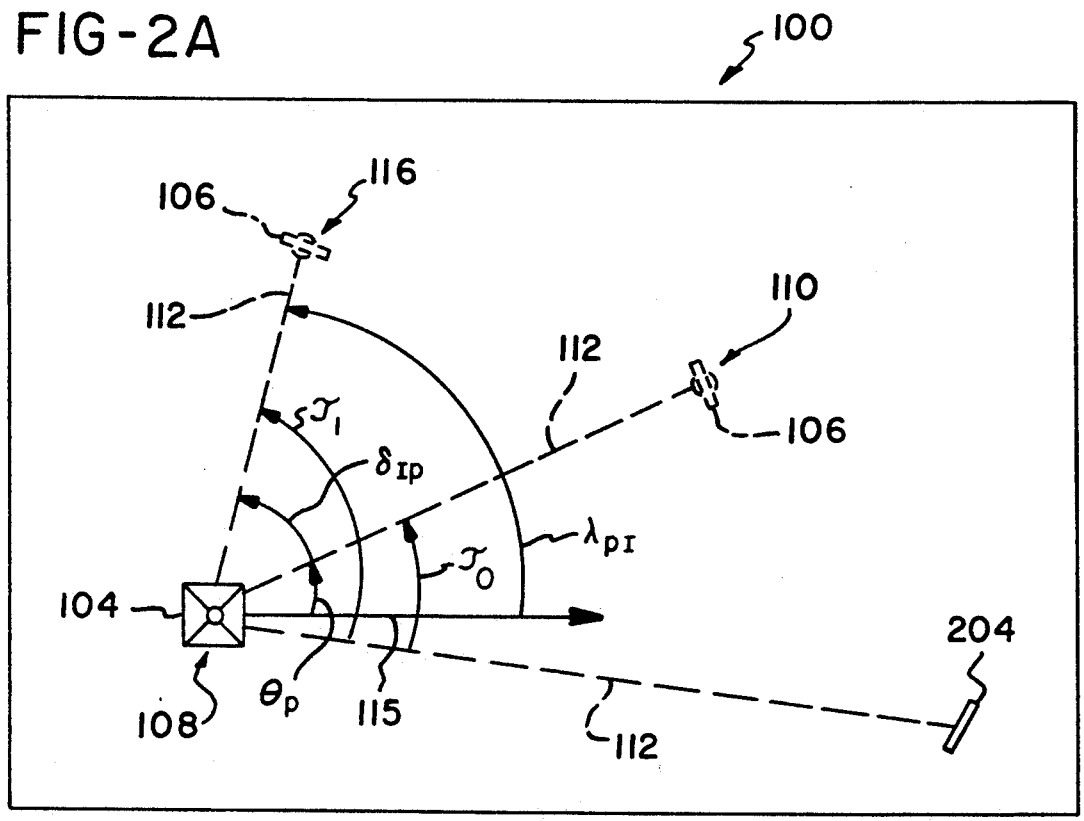
FIGS. 2A and 2B are top plan views of a structured environment defined by four intersecting walls and including primary, secondary and intermediate benchmark positions, a light transmitting and detecting means, a reference-retroreflective element and three position retroreflective elements in which an alternative embodiment of the method and system of the present invention may be advantageously applied.

In an alternative embodiment of the present invention, a third benchmark position, illustrated as an intermediate benchmark position 116 of FIG. 2A, is used to improve the accuracy of the coordinate calculation of position retroreflective element 102. The intermediate benchmark position 116 is located at a third set of coordinates.

Initially, the operator of the light transmitting and detecting means 104 indicates to the computer 522, via an input device (not shown), that the three benchmarks are being used. Referring now to FIG. 2A, it should be noted that the reference retroreflective element 106 is shown in phantom for clarification purposes. The reference retroreflective element 106 will occupy one of the individual phantom areas during a particular step of the method of the present invention, as describe more fully below.

In the intermediate benchmark mode, referencing the angles of the scans to the reference line 115, and therefore to the coordinate frame of reference, is of primary concern, however, some of the scans cannot be referenced until the third coordinates of the intermediate benchmark 116 are known. Therefore, the coordinates of the intermediate benchmark 116 must first be determined. Although conventional surveying techniques may be used to determine the position of the intermediate benchmark position 116, the method of the present invention provides better accuracy and less chance for error. The method of the present invention uses the 'intersection of lines' principle to determine the coordinates of the intermediate benchmark position 116. First, the reference retroreflective element 106 is positioned at the secondary benchmark position 110 and the primary-secondary axis angle $\theta_p$ is calculated as indicated above in the two benchmark mode. An angle $\tau_0$ between a position retroreflective element, shown for example in FIG. 2A at 204, and the secondary benchmark position 116 is also determined.

Next, the reference retroreflective element 106 is repositioned at the intermediate benchmark position 116 and an angle $\tau_1$, located between the element 204 and the intermediate benchmark position 110, is determined. Then a first interior angle $\delta_{PI}$ can be determined from the following equation:

$$\delta_{PI} = \tau_1 \tau_0. \tag{11}$$

Figure 2B:
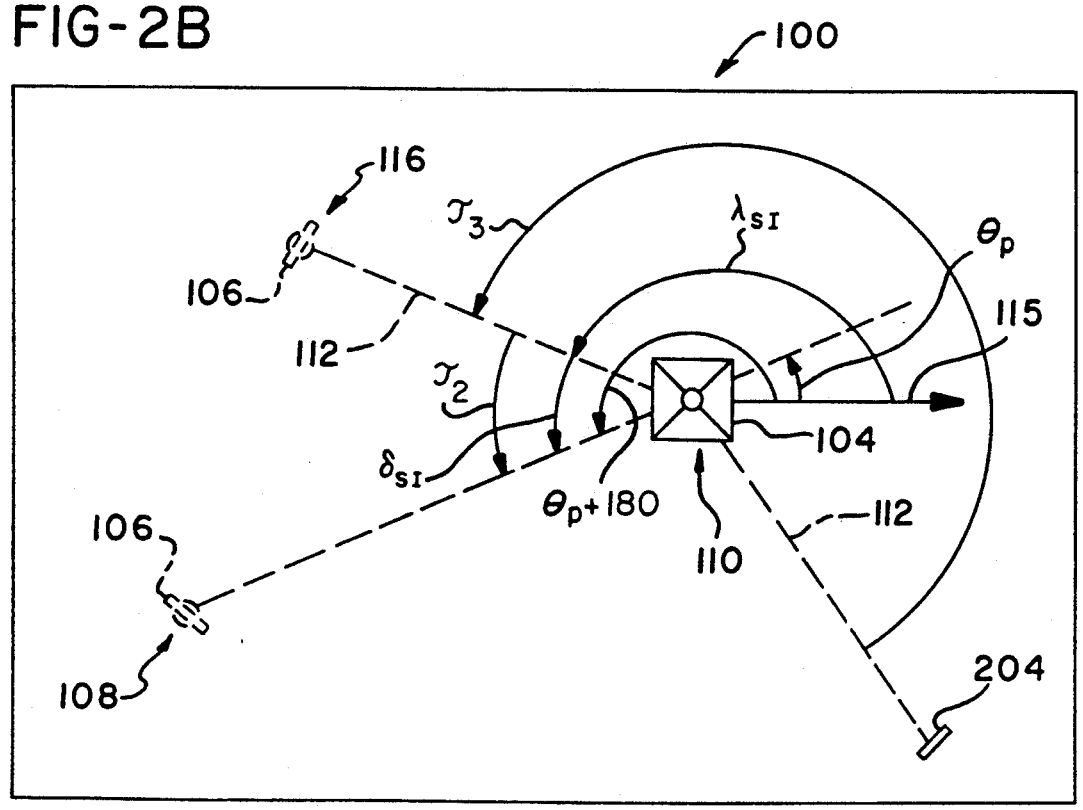

The light transmitting and detecting means 104 is then repositioned at the secondary benchmark position 110, as shown in FIG. 2B. With the reference retroreflective element 106 positioned at the intermediate benchmark position 116, angle $\tau_3$ is measured. The reference retroreflective element 106 is repositioned at the primary benchmark position 108 and angles $\tau_2$ is measured. A second interior angle $\delta_{SI}$ is then determined by the following equation:

$$\delta_{SI} = \tau_2 - \tau_3. \tag{12}$$

To determine the primary-intermediate axis angle $\lambda_{PI}$ and the secondary-intermediate axis angle $\lambda_{SI}$, which are both relative to the reference line 115, and thus the coordinate system, the following equations are solved:

$$\lambda_{PI} = \theta_P + \delta_{PI} \tag{13}$$

$$\lambda_{SI} = \theta_P + 180 - \delta_{SI}. \tag{14}$$

The coordinates of the intermediate benchmark position 116 is then calculated using equations (3), (4) and (5), as delineated above, substituting angles $\lambda_{PI}$ and $\lambda_{SI}$ for angles $\alpha 1$ and $\beta 1$, respectively. Since the intermediate benchmark coordinates, designated IX and IY, are now known, the coordinates of the position retroreflecting element 106 can be measured with increased accuracy. The light transmitting and detecting means 104 and the reference retroreflective element 106 are positioned in five different scan combinations to determine the coordinates of all position retroreflective elements struck by light beam 112. The coordinates of the position retroreflective elements 102, 202 and 204 are then calculated from each scan combination using the same method described above with reference to the two benchmark position procedure.

Specifically, the element coordinates will be calculated for each of the following scan combinations. It should be noted that to be calculated the position retroreflective element must have been acquired in both of the scans.

| Scan combinations | Intersection from |
| --- | --- |
| 1. Scan [0], Scan [2] | (Primary, Secondary) |
| 2. Scan [1], Scan [4] | (Primary, Intermediate) |
| 3. Scan [2], Scan [4] | (Secondary, Intermediate) |
| 4. Scan [3], Scan [1] | (Secondary, Primary) |
| 5. Scan [4], Scan [0] | (Intermediate, Primary) |

Scan [0] occurs with the light transmitting and detecting means 104 on the primary benchmark position 108 and the reference retroreflective element 106 on the secondary benchmark position 108. Scan [1] occurs with the light transmitting and detecting means 104 on the primary benchmark position 108 and the reference retroreflective element 106 on the intermediate benchmark position 116. Scan [2] occurs with the light transmitting and detecting means 104 on the secondary benchmark position 108 and the reference retroreflective element 106 on the intermediate benchmark position 116. Scan [3] occurs with the light transmitting and detecting means 104 on the secondary benchmark position 108 and the reference retroreflective element 106 on the primary benchmark position 110. Finally, Scan [4] occurs with the light transmitting and detecting means 104 on the intermediate benchmark position 116 and the reference retroreflective element 106 on the primary benchmark position 108. The coordinate calculation derivatives, as determined from equations (6) through (10), will again be used to determine which values are the most accurate.

Alternatively, the derivatives may be calculated utilizing successive scan combinations until the derivative values for both the X coordinate and the Y coordinate are less than predetermined maximum X and Y derivative values. For example, X and Y coordinate values are initially calculated from scan [0] and scan [2]. The derivatives of the just calculated X and Y coordinates are calculated as described above using equations (6) through (10). The resulting X and Y derivative values are then compared to their respective maximum X and Y derivative values. If the X derivative value is less than the maximum X derivative value, then the calculated X coordinate value is used as the X coordinate of the position retroreflective element. Similarly, if the Y derivative value is less than the maximum Y derivative value, the calculated Y coordinate value is used as the Y coordinate of the position retroreflective element. In the event that one or both of the calculated X and Y derivative values are not less than their respective maximums, successive scan combinations, as listed above, are employed until acceptable X and Y coordinate values of the position retroreflective element are determined.

In another embodiment of the present invention, the method of the present invention is used to initialize, or set up, a position sensing system, such as the system briefly discussed above and further disclosed in U.S. Pat. No. 5,076,690, to allow operation of the system in a frame of reference where the position of one or more retroreflective elements is initially unknown. After determining the positions of the retroreflective elements, the position sensing system can then determine the position of a point in a predetermined coordinate frame of reference. The operation of the prior art position sensing system will not be further discussed herein since the present invention only concerns the initial determination of the positions of one or more of the retroreflective elements.

To initialize the position sensing system, the operator enters the coordinates of the primary and secondary benchmark positions 108 and 110 into the computer 522. The light transmitting and detecting device 104 is positioned at the primary benchmark position 108 and the reference retroreflective element 106 is positioned at the secondary benchmark position 110. The appropriate angle measurements are then taken as described above. The light transmitting and detecting means 104 and the reference retroreflective element 106 are transposed and further angular measurements are taken. After the positions of at least three stationary retroreflective elements are known, the position sensing system is setup to continuously determine the position of a point in the coordinate frame of reference 100. In addition, a third benchmark, as described above, may preferably be utilized to improve the accuracy of the initialization procedure.

A representative listing of exemplary software stored in the computer 522 for performing angle measurements for both the two benchmark and three benchmark procedures, determining the coordinates of at least one retroreflective element and initializing a position sensing system is as follows.

```
*******************************************************************
*/ include        "capsy.h"

extern   short Chk_stbl();
extern   short Stable, Stbl_reset, Auto_cont, Show_scale, New_pos_fnd,
         Disp_flag;
extern   Num_resets;
extern   Disp_ticks;

short    Ref_Scan(), Temp_GetAngle(), Targ_loc(), Get_targ_coord(),
         Get_targ(), Get_Ibm_co(), Loc_right_targ(), Init_more_targ(),
         Sort_targ_fnd(), Calc_targ(), Targ_known();
long     Ref_ang(), Get_int_ang();
double   Deg_xatan();
/* Array of pointers to targets sorted by their ID (->itarget) */
short           Targ_sort[MAX_ANGLE+1];
short           SU_mode;       /* Represents number of BM's to */
                               /*  be used in setup routine (2 or 3) */
short           SU_step;       /* Current step in the SU routine */
short           Low_disp;      /* 1-Display 10 lowest targets in targ_fnd */
short           Lh_sys=0;      /* Left-handed coordinate system flag */
short           Tot_known;     /* total number of targets known */
tscan           Scan[5];
benchmark       Int_bm;        /* Intermediate benchmark */

/* Test variable */
coord           Targ[5][TARGETS];

/*********************************************************************
* All rights reserved, copyright (c) SP-Laserplane, Inc., 1992
*                  Unpublished Proprietary Information
```

```
*          Use requires license from SP-Laserplane, Inc.
***********************************************************************
*
*   ROUTINE: Prn_targs()
*   PURPOSE: ********* TEMPORARY function **********
*        Prints out target coordinates for the active area.
*
*   INPUTS:
*
*   OUTPUTS:
*
***********************************************************************/ short int Prn_targs( void )
{
        register short i, j;
        register area *aptr=Pvar->areaptr;
        tscan *s;
        short numscan = 2;

if( SU_mode == 3 )        numscan = 5;

printf("\n\nCAPSY Unit # %d\n", Id->unit );
        printf("\nScan contents :\n\n" );
        for( i=0 ; i<numscan ; i++ ) {
          printf( "   Scan[%d]\n", i );
          s = &Scan[i];
          printf( "        CAPSY BM ==>   X = %8.4f        Y = %8.4f\n",
                s->cap_bm->pos.x/(float)U_MULT, s->cap_bm->pos.y/(float)U_MULT )
          printf( "        Ref.  BM ==>   X = %8.4f        Y = %8.4f\n",
                s->ref_bm->pos.x/(float)U_MULT, s->ref_bm->pos.y/(float)U_MULT )
          printf( "        Targets acquired = %d\n\n", s->tot );
          for( j=0 ; j<s->tot ; j++ )
             printf( "           #%2d - %8.3f\n", s->ang[j].itarget,
                        s->ang[j].a/1000.0 );
          printf("\n\n");
        } printf("\n\nCalculated Target Values are : \n\n" );
        for( i=1; i<MAX_ANGLE+1 ; i++ ) {
           printf( "    %2d    X: %11.4lf (%8ld)    Y: %11.4lf (%8ld)\n",
              i, aptr->targ[i].pos.x/(double)U_MULT, aptr->targ[i].dx,
                 aptr->targ[i].pos.y/(double)U_MULT, aptr->targ[i].dy );
           printf( "T_co+%2d   X: %11.4lf                Y: %11.4lf\n\n",
              i, (T_co+i)->x/(double)U_MULT, (T_co+i)->y/(double)U_MULT );
        } printf( "\n\nPvar->areaptr = %x", Pvar->areaptr );
        printf( "\nArea + 0 = %x", Area + 0 );
        printf( "\nArea + 1 = %x", Area + 1 );
        printf( "\nArea + 2 = %x", Area + 2 );

return 0;
}
/***********************************************************************
* All rights reserved, copyright (c) SP-Laserplane, Inc., 1992
*              Unpublished Proprietary Information
*          Use requires license from SP-Laserplane, Inc.
***********************************************************************
*
*   ROUTINE: Entr_2bm_mode()
*   PURPOSE: Sets the SU_mode variable to 2 and initializes the S_setup_1
*        screen.
*
*   INPUTS: none
*
*   OUTPUTS: none
```

```
*
***************************************************************/ short Entr_2bm_mode( void )
{
        SU_mode = 2;
        Init_scrn( &S_setup_1 );
        return 0;
}

/***************************************************************
 * All rights reserved, copyright (c) SP-Laserplane, Inc., 1992
 *                Unpublished Proprietary Information
 *        Use requires license from SP-Laserplane, Inc.
 ***************************************************************
 *
 * ROUTINE: Entr_3bm_mode()
 * PURPOSE: Sets the SU_mode variable to 3 and initializes the S_setup_1
 *          screen.
 *
 * INPUTS: none
 *
 * OUTPUTS: none
 *
 ***************************************************************/ short Entr_3bm_mode( void )
{
        SU_mode = 3;
        Init_scrn( &S_setup_1 );
        return 0;
}

/***************************************************************
 * All rights reserved, copyright (c) SP-Laserplane, Inc., 1992
 *                Unpublished Proprietary Information
 *        Use requires license from SP-Laserplane, Inc.
 ***************************************************************
 *
 * ROUTINE: Setup_1()
 * PURPOSE: Main function for S_setup_1 screen.  Tests for targets to be
 *          stable for STABL_TIME Ticks.  When timeout is achieved then the
 *          target angles are entered and the S_targ_fnd screen is initialized.
 *          First setup routine regardless of whether in two or three BM setup
 *          mode.
 *          SETUP  : CAPSY is on the Primary BM
 *                 : REFERENCE target is on the Secondary BM
 *
 * INPUTS: none
 *
 * OUTPUTS: none
 *
 ***************************************************************/ short Setup_1( void )
{
        if( Run_flag == 1 ) {
           Stable = 0;
           Stbl_reset = 1;
           New_pos_fnd = 0;
           Num_resets = 0;
           Auto_cont = 0;
           Disp_flag = 0;
           Disp_ticks = Ticks;
           Show_scale = 0;
           SU_step = 0;
           Run_flag = 0;

/** make reference and all user-activated targets active **/
```

```
          Actv_targ( 2 );

}

Chk_stbl();

if( Stable == 1 ) {
          Scan[SU_step].cap_bm = Prim_bm;
          Scan[SU_step].ref_bm = Sec_bm;

/*
          for( i=0 ; i<Scan[SU_step].tot ; i++ ) {
            if( A[i].itarget != 0 ) /* don't store angle to Ref. target */
/*            Prim_bm->targ_ang[A[i].itarget-1] = A[i].a;
          }
*/

SU_step = 1;
          Init_scrn( &S_targ_fnd );
        }
        return 0;
}

/***********************************************************************
* All rights reserved, copyright (c) SP-Laserplane, Inc., 1992
*                 Unpublished Proprietary Information
*         Use requires license from SP-Laserplane, Inc.
************************************************************************
*
*   ROUTINE: Two_bm_setup()
*   PURPOSE: Main function for 2bm_setup screen.  Tests for targets to be
*         stable for STABL_TIME Ticks.  When timeout is achieved then the
*         target angles are entered and the S_targ_fnd screen is initialized.
*         Second setup routine for 2 BM setup mode.
*         SETUP    : CAPSY is on the Secondary BM
*                  : REFERENCE target is on the Primary BM
*
*   INPUTS: none
*
*   OUTPUTS: none
*
************************************************************************/ short Two_bm_setup( void )
{
        if( Run_flag == 1 ) {
          Stable = 0;
          Num_resets = 0;
          New_pos_fnd = 0;
          if( Auto_cont == 0 )
            Stbl_reset = 1;
          Run_flag = 0;
        }

Chk_stbl();
        if( Stable == 1   &&   New_pos_fnd > 2 ) {
          Scan[SU_step].cap_bm = Sec_bm;
          Scan[SU_step].ref_bm = Prim_bm;

/*
          for( i=0 ; i<Scan[SU_step].tot ; i++ ) {
            /* Put angles into Sec_bm->targ_ang for future reference */
/*          if( A[i].itarget != 0 ) /* don't store angle to Ref. target */
/*            Sec_bm->targ_ang[A[i].itarget-1] = A[i].a;
          }
*/

/********* Calculate target positions with 2 BM's **********/
          Calc_targ();
```

```c
        /* Activate known targets */
        Actv_targ( 1 );

SU_step = 2;
        Init_scrn( &S_targ_fnd );
     }
     return 0;
}

/****************************************************************
* All rights reserved, copyright (c) SP-Laserplane, Inc., 1992
*              Unpublished Proprietary Information
*         Use requires license from SP-Laserplane, Inc.
*****************************************************************
*
*  ROUTINE: Setup_2()
*  PURPOSE: Main function for S_setup_2 screen.  Tests for targets to be
*       stable for STABL_TIME Ticks.  When timeout is achieved then the
*       target angles are entered and the S_targ_fnd screen is initialized.
*       Second setup routine for the 3 BM setup mode.
*       SETUP   : CAPSY is on the Primary BM
*               : REFERENCE target is on the Intermediate BM
*
*  INPUTS: none
*
*  OUTPUTS: none
*
*****************************************************************/ short Setup_2( void )
{
        if( Run_flag == 1 ) {
           Stable = 0;
           New_pos_fnd = 0;
           Num_resets = 0;
           if( Auto_cont == 0 )
              Stbl_reset = 1;
           Run_flag = 0;
        }

Chk_stbl();
        if( Stable == 1  &&   New_pos_fnd > 2 ) {
           Scan[SU_step].cap_bm = Prim_bm;
           Scan[SU_step].ref_bm = &Int_bm;

SU_step = 2;
           Init_scrn( &S_targ_fnd );
        }
        return 0;
}

/****************************************************************
* All rights reserved, copyright (c) SP-Laserplane, Inc., 1992
*              Unpublished Proprietary Information
*         Use requires license from SP-Laserplane, Inc.
*****************************************************************
*
*  ROUTINE: Setup_3()
*  PURPOSE: Main function for S_setup_3 screen.  Tests for targets to be
*       stable for STABL_TIME Ticks.  When timeout is achieved then the
*       target angles are entered and the S_targ_fnd screen is initialized
*       Third setup routine used for the 3 BM setup mode.
*       SETUP   : CAPSY is on the Secondary BM
*               : REFERENCE target is on the Intermediate BM
*
*  INPUTS: none
*
*  OUTPUTS: none
*
```

```c
short Setup_3( void )
{
        if( Run_flag == 1 ) {
          Stable = 0;
          New_pos_fnd = 0;
          Num_resets = 0;
          if( Auto_cont == 0 )
            Stbl_reset = 1;
          Run_flag = 0;
        }
        /**************** Stability Test function here ***********/

Chk_stbl();
        if( Stable == 1   &&   New_pos_fnd > 2 ) {
          Scan[SU_step].cap_bm = Sec_bm;
          Scan[SU_step].ref_bm = &Int_bm;

/*
          for( i=0 ; i<Scan[SU_step].tot ; i++ ) {
            /* Put angles into Sec_bm->targ_ang for future reference */
/*          if( A[i].itarget != 0 ) /* don't store angle to Ref. target */
/*            Sec_bm->targ_ang[A[i].itarget-1] = A[i].a;
          }
*/

SU_step = 3;
          Init_scrn( &S_targ_fnd );
        }
        return 0;
}

/*************************************************************************
* All rights reserved, copyright (c) SP-Laserplane, Inc., 1992
*               Unpublished Proprietary Information
*         Use requires license from SP-Laserplane, Inc.
**************************************************************************
*
*  ROUTINE: Setup_4()
*  PURPOSE: Main function for S_setup_4 screen.  Tests for targets to be
*       stable for STABL_TIME Ticks.  When timeout is achieved then the
*       target angles are entered and the S_targ_fnd screen is initialized.
*       Fourth setup routine used for the 3 BM setup mode.
*       SETUP   : CAPSY is on the Secondary BM
*               : REFERENCE target is on the Primary BM
*
*  INPUTS: none
*
*  OUTPUTS: none
*
**************************************************************************/ short Setup_4( void )
{
        if( Run_flag == 1 ) {
          Stable = 0;
          New_pos_fnd = 0;
          Num_resets = 0;
          if( Auto_cont == 0 )
            Stbl_reset = 1;
          Run_flag = 0;
        }

Chk_stbl();

if( Stable == 1   &&   New_pos_fnd > 2 ) {
          Scan[SU_step].cap_bm = Sec_bm;
          Scan[SU_step].ref_bm = Prim_bm;
```

```c
            SU_step = 4;
            Init_scrn( &S_targ_fnd );
         }
         return 0;
}

/************************************************************************
* All rights reserved, copyright (c) SP-Laserplane, Inc., 1992
*             Unpublished Proprietary Information
*          Use requires license from SP-Laserplane, Inc.
*************************************************************************
*
*  ROUTINE: Setup_5()
*  PURPOSE: Main function for S_setup_5 screen. Tests for targets to be
*       stable for STABL_TIME Ticks. When timeout is achieved then the
*       target angles are entered and the S_targ_fnd screen is initialized.
*       Fifth setup routine for the BM setup mode.
*       SETUP    : CAPSY is on the Intermediate BM
*                : REFERENCE target is on the Primary BM
*
*  INPUTS: none
*
*  OUTPUTS: none
*
*************************************************************************/ short Setup_5( void )
{ if( Run_flag == 1 ) {
          Stable = 0;
          New_pos_fnd = 0;
          Num_resets = 0;
          if( Auto_cont == 0 )
            Stbl_reset = 1;
          Run_flag = 0;
        }

Chk_stbl();

if( Stable == 1   &&   New_pos_fnd > 2 ) {
          Scan[SU_step].cap_bm = &Int_bm;
          Scan[SU_step].ref_bm = Prim_bm;

/********* Calculate target positions with 3 BM's *********/
          Calc_targ();
          /* Activate known targets */
          Actv_targ( 1 );

SU_step = 5;
          Init_scrn( &S_targ_fnd );
        }
        return 0;
}

/************************************************************************
* All rights reserved, copyright (c) SP-Laserplane, Inc., 1992
*             Unpublished Proprietary Information
*          Use requires license from SP-Laserplane, Inc.
*************************************************************************
*
*  ROUTINE: Targ_known()
*  PURPOSE: Determines if a targets coordinates are known (The target can
*       be used to calculate a position).
*
*  INPUTS: short id - Id of the target to be tested.
*
*  OUTPUTS:  0 if targets position is not known.
*            1 if targets position is known.
*
```

```
short Targ_known( short id )
{
        register area    *aptr=Pvar->areaptr;

if( aptr->targ[id].pos.x != NOT_USED   &&
            aptr->targ[id].pos.y != NOT_USED  )
          return 1;
        else
          return 0;
}

/************************************************************************
* All rights reserved, copyright (c) SP-Laserplane, Inc., 1992
*               Unpublished Proprietary Information
*         Use requires license from SP-Laserplane, Inc.
*************************************************************************
*
*  ROUTINE: Targs_known()
*  PURPOSE: Main function for S_targs_known screen.  Looks to see which
*       targets have had both their X and Y coordinates determined.
*       Then displays their target ID's to the LCD and if more than ten
*       were found then the provision is made for a "MORE" function key
*       to display the remainder of the target ID's.
*
*  INPUTS: none
*
*  OUTPUTS: none
*
*************************************************************************/ short Targs_known( void )
{
        register short i;

if( Run_flag == 1 ) {
          Tot_known = 0;
          Low_disp = 0;

/* Determine which targets are known and how many */
          for( i=1 ; i<TARGETS+1 ; i++ )
            if( Targ_known( i ) )
              Targ_sort[++Tot_known] = i;

if( Tot_known < 1 ) {
            Cprintf( 1, 3, "No targets are" );
            Cprintf( 2, 2, '"currently known" );
            Bsend_psion();
          }
          else {
            /* If > 10 targs, 2nd display screen */
            if( Tot_known > 11 )
              Init_more_targ();
            Print_targ_fnd();
          }

Run_flag = 0;
        } return 0;
}

/************************************************************************
* All rights reserved, copyright (c) SP-Laserplane, Inc., 1992
*               Unpublished Proprietary Information
*         Use requires license from SP-Laserplane, Inc.
*************************************************************************
*
*  ROUTINE: Targs_known_cont()
```

```
*   PURPOSE: Used as an f_key function for the S_targs_known screen.  Tests to
*        see where it was called from and initializes the appropriate Screen
*        accordingly.
*
*   INPUTS: none
*
*   OUTPUTS: none
*
*********************************************************************/ short Targs_known_cont( void )
{
        /* Redefine S_targ_fnd .f_key[0] and .line3 */
        S_targs_known.f_key[0] = F_null;
        strcpy( S_targs_known.line3, "                    CONT" );

if( Prev_scrn[0] == &S_targ_fnd )          /* After Setup procedure */
          Init_scrn( &S_setup_again );

return 0;
}

/*********************************************************************
* All rights reserved, copyright (c) SP-Laserplane, Inc., 1992
*              Unpublished Proprietary Information
*        Use requires license from SP-Laserplane, Inc.
*********************************************************************
*
*   ROUTINE: Targ_fnd()
*   PURPOSE: Main function for S_targ_fnd screen.  Looks to see which targets
*        were located in the previous Scan.  Then displays their
*        target ID's to the LCD and if more than ten were found then the
*        provision is made for a "MORE" function key to display the remainder
*        if the target ID's.
*
*   INPUTS: none
*
*   OUTPUTS: none
*
*********************************************************************/ short Targ_fnd( void )
{
        if( Run_flag == 1 ) {
          /*SU_step++;*/
          Low_disp = 0;

/* Reset variables used for stability routines */
          Auto_cont = 0;
          Stbl_reset = 1;
          Show_scale = 0;

/* Sort targets acquired */
          Sort_targ_fnd( Scan[SU_step-1] );
          /* If > 10 targs, 2nd display screen */
          if( Scan[SU_step-1].tot > 11 )
            Init_more_targ();
          Print_targ_fnd();

Run_flag = 0;
        }

/* Checks to see if conditions have been met to allow for
           automatically going to the next step in the Setup procedure */
        if( !(SU_mode == 2   &&   SU_step == 2)   &&
            !(SU_mode == 3   &&   SU_step == 5)   )
          Chk_stbl();

return 0;
```

}

```
/************************************************************************
 * All rights reserved, copyright (c) SP-Laserplane, Inc., 1992
 *               Unpublished Proprietary Information
 *        Use requires license from SP-Laserplane, Inc.
 ************************************************************************
 *
 * ROUTINE: Sort_targ_fnd()
 * PURPOSE: Fills Targ_sort with the target ID numbers from a scan sorted
 *       in ascending order.
 *
 * INPUTS:
 *
 * OUTPUTS:
 *
 ************************************************************************/ short Sort_targ_fnd( tscan scan )
{
        register short i, j;
        short tmp;

/* Copy scan.ang's to Targ_sort array */
        for( i=0 ; i<scan.tot ; i++ )
          Targ_sort[i] = scan.ang[i].itarget;

/* Sort Targ_sort */
        for( i=0 ; i< (scan.tot)-1 ; i++ )
          for( j=i+1 ; j< scan.tot ; j++ )
            if( Targ_sort[j]  <  Targ_sort[i] ) {
              tmp = Targ_sort[i];
              Targ_sort[i] = Targ_sort[j];
              Targ_sort[j] = tmp;
            } return 0;
}

/************************************************************************
 * All rights reserved, copyright (c) SP-Laserplane, Inc., 1992
 *               Unpublished Proprietary Information
 *        Use requires license from SP-Laserplane, Inc.
 ************************************************************************
 *
 * ROUTINE: Init_more_targ()
 * PURPOSE: Used for the S_targ_fnd and S_targs_known screens.  If more
 *       than 12 targets have been acquired this function is called to
 *       redefine Scrn->f_key[0] to More_targ() and to redefine the
 *       Scrn->line3 to "MORE    CONT"
 *
 * INPUTS: none
 *
 * OUTPUTS: none
 *
 ************************************************************************/ short Init_more_targ( void )
{
        Scrn->f_key[0] = Print_targ_fnd;
        strcpy( Scrn->line3, "MORE           CONT" );
        Print_line3();
        Bsend_psion();
        return 0;
}

/************************************************************************
```

```
* All rights reserved, copyright (c) SP-Laserplane, Inc., 1992
*                Unpublished Proprietary Information
*         Use requires license from SP-Laserplane, Inc.
***********************************************************************
*
*  ROUTINE: Print_targ_fnd()
*  PURPOSE: Prints out the ID numbers of the targets found.  If Low_disp=0
*        then the lower 10 targets found are printed and Low_disp is set to 1.
*        Otherwise the 11th to total_fnd is printed to the display and
*        Low_disp is set to 0.
*
*  INPUTS: none
*
*  OUTPUTS: none
*
***********************************************************************/ short Print_targ_fnd( void )
{
        register short i;
        short tot;

if( Scrn == &S_targ_fnd )
          tot = Scan[SU_step-1].tot;

else     /* Screen is S_targs_known */
          tot = Tot_known+1;

/* Start with i=1 so we don't print the Ref. ID in Targ_sort[0] */
        i = 1;

Clr_lines( 1, 2 );
        if( tot-1 < 11 ) {
          for( ; i<tot ; i++ )
            if( i<6 )
              Cprintf( 1, ((i-1)*4)+1, "%2d", Targ_sort[i] );
            else
              Cprintf( 2, ((i-6)*4)+1, "%2d", Targ_sort[i] );
        }
        else if( Low_disp==0 ) {
          for( ; i<11 ; i++ )
            if( i<6 )
              Cprintf( 1, ((i-1)*4)+1, "%2d", Targ_sort[i] );
            else
              Cprintf( 2, ((i-6)*4)+1, "%2d", Targ_sort[i] );
          Low_disp = 1;
        }
        else if( Low_disp==1 ) {
          for( ; i<tot-10 ; i++ )
            if( i<6 )
              Cprintf( 1, ((i-1)*4)+1, "%2d", Targ_sort[i+10] );
            else
              Cprintf( 2, ((i-6)*4)+1, "%2d", Targ_sort[i+10] );
          Low_disp = 0;
        }

Bsend_psion();
        return 0;
}

/***********************************************************************
* All rights reserved, copyright (c) SP-Laserplane, Inc., 1992
*                Unpublished Proprietary Information
*         Use requires license from SP-Laserplane, Inc.
***********************************************************************
*
*  ROUTINE: Targ_fnd_cont_sw()
*  PURPOSE: Used as an f_key function for the S_targ_fnd screen.  Tests to
*        see where it was called from and initializes the appropriate Screen
*        accordingly.
```

```c
 *
 *  INPUTS: none
 *
 *  OUTPUTS: none
 *
 ***********************************************************************/ short Targ_fnd_cont_sw( void )
{
        Targ_fnd_cont();
        return 0;
}

/************************************************************************
 *  All rights reserved, copyright (c) SP-Laserplane, Inc., 1992
 *                  Unpublished Proprietary Information
 *           Use requires license from SP-Laserplane, Inc.
 ************************************************************************
 *
 *  ROUTINE: Targ_fnd_cont()
 *  PURPOSE: Used as an f_key function for the S_targ_fnd screen.  Tests to
 *        see where it was called from and initializes the appropriate Screen
 *        accordingly.
 *
 *  INPUTS: none
 *
 *  OUTPUTS: none
 *
 ***********************************************************************/ short Targ_fnd_cont( void )
{
        /* Redefine S_targ_fnd .f_key[0] and .line3 */
        S_targ_fnd.f_key[0] = F_null;
        strcpy( S_targ_fnd.line3, "                    CONT" );
        if( SU_step == 1 )
          if( SU_mode==2 ) {
             /* Re-initialize this in the event that it was modified
                  during a previous run of the setup in stable.c */
             S_2bm_setup.f_key[3] = F_null;
             Init_scrn( &S_2bm_setup );
          }
          else {
             /* Re-initialize this in the event that it was modified
                  during a previous run of the setup in stable.c */
             S_setup_2.f_key[3] = F_null;
             Init_scrn( &S_setup_2 );
          } else if( SU_step == 2   &&   SU_mode == 2 )
          Init_scrn( &S_targs_known );

else if( SU_step == 2 ) {
          /* Re-initialize this in the event that it was modified
                during a previous run of the setup in stable.c */
          S_setup_3.f_key[3] = F_null;
          Init_scrn( &S_setup_3 );
        }
        else if( SU_step == 3 ) {
          /* Re-initialize this in the event that it was modified
                during a previous run of the setup in stable.c */
          S_setup_4.f_key[3] = F_null;
          Init_scrn( &S_setup_4 );
        }
        else if( SU_step == 4 ) {
          /* Re-initialize this in the event that it was modified
                during a previous run of the setup in stable.c */
          S_setup_5.f_key[3] = F_null;
          Init_scrn( &S_setup_5 );
```

```c
        }
        else if( SU_step == 5 )
           Init_scrn( &S_targs_known );

return 0;
}

/*********************************************************************
 * All rights reserved, copyright (c) SP-Laserplane, Inc.; 1992
 *                 Unpublished Proprietary Information
 *           Use requires license from SP-Laserplane, Inc.
 *********************************************************************
 *
 *  ROUTINE: Calc_targ()
 *  PURPOSE: Calculates target positions after Angles have been acquired from
 *       the Benchmarks.
 *
 *  INPUTS: none
 *
 *  OUTPUTS: none
 *
 *********************************************************************/ short Calc_targ( void )
{
        register short i, j;
        short num_scans;

if( SU_mode==2 ) {
          num_scans = 2;
          /* Reference all angles to the X axis */
          Ref_Scan( &Scan[0] );
          Ref_Scan( &Scan[1] );
        } else if ( SU_mode == 3 ) {      /* 3 Benchmark setup mode */
          num_scans = 5;

/* Calculate Intermediate BM coordinates */
          Get_Ibm_co();
          /* Reference all Scan angles to the X ¿
          for( i=0 ; i<5 ; i++ )
             Ref_Scan( &Scan[i] );
        } if( Lh_sys==1 )         /* If left-handed
          for( j=0 ; j<num_scans ; j++ )
             for( i=0 ; i<Scan[0].tot ; i++ )
                Scan[j].ang[i].a = 360000 - Scan[:

Get_targ();

return 0;
}

/*******************************************
 * All rights reserved, copyright (c) SP-Laserpla:
 *                 Unpublished Proprietary Infor
 *           Use requires license from SP-Laserpl
 *******************************************
 *
 *  ROUTINE: Get_Ibm_co()
 *  PURPOSE: Used in the three BM setup mode to c
 *       the Intermediate Benchmark.
 *
 *  INPUTS: none
 *
 *  OUTPUTS: none
```

```c
*
*************************************************..

short Get_Ibm_co( void )
{
        long axis_ang, int_ang[2];
        long pi_ang, si_ang;

/* Get angle of Prim-Sec axis w.r.t. the
        axis_ang = Ref_ang( Prim_bm->pos, Sec_bm int_ang[0] = Get_int_ang( &Scan[0], &Sca
        int_ang[1] = Get_int_ang( &Scan[2], &Sca if( Lh_sys == 1 ) {              /* Left_
          int_ang[0] = -int_ang[0];      /* char
          int_ang[1] = -int_ang[1];
        }
        /* Get angle of Prim-Int axis w.r.t. the X axis */
        pi_ang = axis_ang + int_ang[0];

si_ang = axis_ang + 180000 - int_ang[1];
        Get_targ_coord( pi_ang, si_ang, &Scan[0], &Int_bm.pos, 0 );
        return 0;
}

/****************************************************************
* All rights reserved, copyright (c) SP-Laserplane, Inc., 1992
*               Unpublished Proprietary Information
*         Use requires license from SP-Laserplane, Inc.
*****************************************************************
*
*  ROUTINE: Get_int_ang()
*  PURPOSE: Finds the nearest target to the right of the reference targets
*       which is common to both scans and uses that target to determine the
*       interior angle between the benchmarks. The two Scan arguments must
*       have been scanned with CAPSY at the same benchmark, which corresponds
*       to the vertex of the interior angle to be determined. ( Ex.: angle
*       between Sec. BM and Int. BM as seen from from the Prim. BM ).
*       The polarity of the angle returned will correspond to the
*       right-handed coordinate system which is positive in the CCW
*       direction.
*
*  INPUTS: tscan *a : Scan which contains the initial side of the interior
*                     angle
*          tscan *b : Scan which contains the terminal side of the interior
*                     angle ( CCW w.r.t. initial side for a right-handed
*                     system ).
*
*  OUTPUTS: long int_ang : The interior angle (degrees * 1000)
*
*****************************************************************/ long Get_int_ang( tscan *a, tscan *b )
{
        register short i, rtarg;
        tangle *tmp1, *tmp2, *ref1, *ref2;
        long diff1, diff2;

/* Locates the nearest target which is to the right of BOTH */
        /*   reference targets */
        rtarg = Loc_right_targ( a, b );

/* Get Reference target angle from first struct */
        for( i=0, ref1=a->ang ; i< a->tot ; i++, ref1++ )
          if( ref1->itarget == 0 )
            break;
        /* Get Right target angle from first struct */
        for( i=0, tmp1=a->ang ; i< a->tot ; i++, tmp1++ )
          if( tmp1->itarget == rtarg )
            break;
```

```
        /* Get Reference target angle from second struct */
        for( i=0, ref2=b->ang ; i< b->tot ; i++, ref2++ )
          if( ref2->itarget == 0 )
            break;
        /* Get Right target angle from second struct */
        for( i=0, tmp2=b->ang ; i< b->tot ; i++, tmp2++ )
          if( tmp2->itarget == rtarg )
            break;

/* Find two angle positions relative to rtarg */
        diff1 = tmp1->a - ref1->a;
        diff2 = tmp2->a - ref2->a;

return( diff2 - diff1 );
}

/***********************************************************************
 * All rights reserved, copyright (c) SP-Laserplane, Inc., 1992
 *             Unpublished Proprietary Information
 *        Use requires license from SP-Laserplane, Inc.
 ***********************************************************************
 *
 * ROUTINE: Loc_right_targ()
 * PURPOSE: Locates the nearest target which is to the right of BOTH
 *       reference targets contained in the two scans.
 *
 * INPUTS: tscan *a : one of two scans
 *         tscan *b : two of two scans
 *
 * OUTPUTS: Returns the target ID of the nearest target to the right.
 *
 ***********************************************************************/ short Loc_right_targ( tscan *a, tscan *b)
{
        register short i, j, k;
        short min, minj, id;
        register tangle *aptr;
        register tscan *sptr;
        tangle *ref, tmp, order[2][MAX_ANGLE+1];
        long angle;

/* Loop sorts tscan a and then tscan b */
        for( k=0, sptr=a ; k<2 ; k++, sptr=b ) {
        /* Find reference angle structure for tscan sptr */
        for( i=0, aptr=sptr->ang ; i<sptr->tot ; i++, aptr++ )
          if( aptr->itarget == 0 )    /* Reference ID */
            ref = aptr;

/* Copy angle structs to order array */
        /* Make all angles relative to Ref. target angle, not index */
        for( i=0, aptr=sptr->ang ; i<sptr->tot ; i++, aptr++ ) {
          order[k][i] = *aptr;
          angle = ref->a - aptr->a;
          if( angle < 0 )      /* aptr->a is to left of index */
            angle = -angle;
          else                 /* aptr->a is between Ref. and index */
            angle = 360000 - angle;
          order[k][i].a = angle;
        }

/* Sort targets in CW direction (ascending angle) */
        /* Ref. target angle will equal 360 degrees after previous loop */
        for( j=0 ; j< sptr->tot-1 ; j++ )
          for( i=j+1 ; i< sptr->tot ; i++ )
            if( order[k][i].a < order[k][j].a ) {
              tmp = order[k][j];
              order[k][j] = order[k][i];
              order[k][i] = tmp;
```

```c
            }
         }

/* Find nearest target to the right of both targets */
         min = 1000;         /* arbitrary large number to initialize */
         for( j=0 ; j< a->tot-1 ; j++ )
            for( i=0 ; i< b->tot-1 ; i++ ) {
               id = order[0][j].itarget;
               if( id==order[1][i].itarget )
                  if( j+i < min ) {
                     min = j+i;
                     minj = j;       /* min j kept to return right targ id with */
                     break;
                  }
            }
            return( order[0][minj].itarget );
}

/**********************************************************************
* All rights reserved, copyright (c) SP-Laserplane, Inc., 1992
*               Unpublished Proprietary Information
*          Use requires license from SP-Laserplane, Inc.
***********************************************************************
*
*   ROUTINE: Ref_Scan()
*   PURPOSE: Converts the angles in a Scan[] to be relative to the X axis.
*
*   INPUTS: tscan *sptr : Pointer to the Scan[] to be referenced
*
*   OUTPUTS: none
*
**********************************************************************/ short Ref_Scan( tscan *sptr )
{
        short i;
        tangle *tmp;
        long ref, rot;

/* Angle rotation of Reference axis w.r.t. the x axis */
        rot = Ref_ang( sptr->cap_bm->pos, sptr->ref_bm->pos );

if( Lh_sys == 1 )      /* Change rotation to Right-handed system */
           rot = 360000 - rot; /*  for compatibility with other routines */

/* Find value of Reference angle */
        tmp = sptr->ang;
        while( tmp->itarget!=0 )
           tmp++;
        ref = tmp->a;

for( i=0, tmp=sptr->ang ; i<sptr->tot ; i++, tmp++ ) {
           /* Get angle with respect to the Reference axis */
           tmp->a -= ref;
           /* Subtract Reference angle rotation from each angle */
           tmp->a = rot - tmp->a;
           /* Put in 0 to 360 range - probably not required */
           if( tmp->a < 0 )
              tmp->a += 360000;
           else if( tmp->a > 360000 )
              tmp->a -= 360000;
        } return 0;
}

/**********************************************************************
```

```
* All rights reserved, copyright (c) SP-Laserplane, Inc., 1992
*                Unpublished Proprietary Information
*          Use requires license from SP-Laserplane, Inc.
***************************************************************************
*
*  ROUTINE: Ref_ang()
*  PURPOSE: Returns the angle with respect to the X-axis as determined
*       from the 'a' coord to the 'b' coord.
*
*  INPUTS: coord a : coordinates of the vertex ("relative origin").
*          coord b : coordinates of the endpoint ("relative abscissa and
*                    ordinate").
*
*  OUTPUTS: returns the angle (degrees * 1000).
*
***************************************************************************/ long Ref_ang( coord a, coord b )
{
        double drot;
        /* Angle rotation of Reference axis w.r.t. the x axis */
        drot = Deg_xatan( (double)(b.x - a.x), (double)(b.y - a.y) );

/* convert rotation to integer form (x1000)*/
        return( drot*1000 );
}

/***************************************************************************
* All rights reserved, copyright (c) SP-Laserplane, Inc., 1992
*                Unpublished Proprietary Information
*          Use requires license from SP-Laserplane, Inc.
***************************************************************************
*
*  ROUTINE: Deg_xatan()
*  PURPOSE: Given delta 'x' and delta 'y' as inputs, the Reference angle in
*       degrees is returned in the range of 0 to 360 degrees
*
*  INPUTS:
*
*  OUTPUTS:
*
***************************************************************************/ double Deg_xatan( double x, double y )
{
        double val;

if( x >= 0.0  &&  y >= 0.0 ) {          /* Quadrant I */
          if( x == 0 )
            val = M_PI_2;
          else
            val = atan( y / x );
        }
        else if( x < 0.0  )                     /* Quadrant II or III */
          val = M_PI + atan( y / x );           /* atan in Quad II is < 0 */

/* Quadrant IV */
        else
          if( x == 0.0 )
            val = 3 * M_PI_2;
          else
            val = 2 * M_PI + atan( y / x );     /* atan will be < 0 */ return( val*(180.0 / M_PI) );
}

/***************************************************************************
```

* All rights reserved, copyright (c) SP-Laserplane, Inc., 1992
* Unpublished Proprietary Information
* Use requires license from SP-Laserplane, Inc.
***********************************************************************
*
* ROUTINE: Get_targ()
* PURPOSE: Calls Targ_loc() for each target to determine target position.
*
* INPUTS: none
*
* OUTPUTS: none
*
***********************************************************************/

```c
short Get_targ( void )
{
        register short i, j;
        short targfnd;
        coord co;
        tangle *ret[2];

if( SU_mode==2 )         /* 2 Benchmark calibration mode */
        for( i=1 ; i<TARGETS ; i++ ) {
          targfnd = Targ_loc( i, Scan[0].ang, Scan[1].ang , ret );
          if( targfnd == 1 )
             Get_targ_coord( ret[0]->a, ret[1]->a, &Scan[0], &co, i );
        }
        else if( SU_mode ==3 ) {        /* 3 Benchmark calibration mode */
          for( j=0 ; j<5 ; j++ )
             /* Start with i=1 so we don't calculate the Benchmark positions */
             for( i=1 ; i<TARGETS ; i++ ) {
               if( j==0    ||    j==2 )
                  targfnd = Targ_loc( i, Scan[j].ang, Scan[j+2].ang, ret );
               else if( j==1 )
                  targfnd = Targ_loc( i, Scan[1].ang, Scan[4].ang, ret );
               else if( j==3 )
                  targfnd = Targ_loc( i, Scan[3].ang, Scan[1].ang, ret );
               else if( j==4 )
                  targfnd = Targ_loc( i, Scan[4].ang, Scan[0].ang, ret );

if( targfnd == 1 ) {
                  Get_targ_coord( ret[0]->a, ret[1]->a, &Scan[j], &co, i );

/* Targ[][] is a temporary test variable */
               Targ[j][i].x = co.x;
               Targ[j][i].y = co.y;

}
             }
        }
        return 0;
}
```

/***********************************************************************
* All rights reserved, copyright (c) SP-Laserplane, Inc., 1992
* Unpublished Proprietary Information
* Use requires license from SP-Laserplane, Inc.
***********************************************************************
*
* ROUTINE: Targ_loc()
* PURPOSE: Determines if a target was located in both Scan structs. If it
*      was found in both then a 1 is returned and pointers to the two angle
*      structures are placed in ret[], if not a 0 is returned.
*
* INPUTS: short itarget    : The ID of the target
*         tangle *a : Pointer to the 'ang[]' of first Scan
*         tangle *b : Pointer to the 'ang[]' of second Scan
*         tangle *ret[2] : Two pointers are placed here which point
*              to the two Scan.ang's which have the common target(itarget).

```
*
*  OUTPUTS: returns a 1 if the target was located in both Scans.
*           returns a 0 if the target was not located in both Scans.
*
*************************************************************************/
short Targ_loc( short itarget, tangle *a, tangle *b, tangle *ret[2] )
{
        short i, fnd=0;
        tangle *tmp;

/* Look for target ID in 'a' array */
        for( i=0, tmp=a ; i<MAX_ANGLE+1 ; i++, tmp++ )
          if( tmp->itarget == itarget ) {
            ret[0] = tmp;
            fnd = 1;
            break;
          }
        if( fnd == 1 )
          /* Look for target ID in 'b' array */
          for( i=0, tmp=b ; i<MAX_ANGLE+1 ; i++, tmp++ )
            if( tmp->itarget == itarget ) {
              ret[1] = tmp;
              return 1;
            }
        return 0;
}

/*************************************************************************
* All rights reserved, copyright (c) SP-Laserplane, Inc., 1992
*              Unpublished Proprietary Information
*        Use requires license from SP-Laserplane, Inc.
*************************************************************************
*
*  ROUTINE: Get_targ_coord()
*  PURPOSE: Calculates the coordinates of a target.
*
*  INPUTS: long anga : 'alpha' angle
*          long angb : 'beta' angle
*          coord *coptr : the x and y values will be returned in *coptr and
*                 and put into areaptr->targ[].pos.x or .y if the derivative is
*                 less than areaptr->targ[].dx or .dy respectively.
*
*  OUTPUTS: none
*
*************************************************************************/ short Get_targ_coord( long anga, long angb, tscan *sptr, coord *coptr,
                      short targ_id )
{
        register area   *aptr=Pvar->areaptr;

double px, py, sx, sy, x, ya, yb, alpha, beta;
        double dx_dtot, dy_dalpha, dy_dbeta, denom, dx_dalpha, dx_dbeta;
        double tana, tanb;

px = (double)sptr->cap_bm->pos.x;
        py = (double)sptr->cap_bm->pos.y;
        sx = (double)sptr->ref_bm->pos.x;
        sy = (double)sptr->ref_bm->pos.y;

alpha = (double)anga * M_PI / 180000.0;
        beta  = (double)angb * M_PI / 180000.0;
        tana = tan(alpha);
        tanb = tan(beta);
/*
if( targ_id==1 )
  printf("\n");
printf("alpha = %8.3lf    beta = %8.3lf\n", alpha * 180.0 / M_PI,
                beta * 180.0 / M_PI );
```

```
        x = (sy - py - (sx * tanb) + (px * tana) ) / ( tana - tanb );

denom = SQ( tana - tanb );
        /* If minimum derivative then put coordinate into areaptr->targ[] */
        /* Calculate X derivatives w.r.t. alpha and beta */
        dx_dalpha = ( ( 1+SQ(tana) ) * ( py-sy+( tanb*(sx-px) ) ) ) / denom;
        dx_dbeta  = ( ( 1+SQ(tanb) ) * ( sy-py+( tana*(px-sx) ) ) ) / denom;

/* Calculate Total derivative of X w.r.t. alpha and beta combined */
        dx_dtot = sqrt( SQ(dx_dalpha) + SQ(dx_dbeta) );
        /* If dx_dtot is less than areaptr->dx[] then put into areaptr->targ */
        /* targ_id == 0 is sent when getting the Intermediate BM coord's */
        if( dx_dtot < aptr->targ[targ_id].dx  &&  targ_id != 0 ) {
          aptr->targ[targ_id].dx = (long)dx_dtot;
          aptr->targ[targ_id].pos.x = x;
        }

/* Test for best Y calculation : minimum derivative */
        /* Formula #1 for Y using alpha */
        ya = py - ( tana * (px - x) );
        dy_dalpha = ( ( 1+SQ(tana) )*(x-px) ) + tana*dx_dalpha;
        if( fabs(dy_dalpha) < aptr->targ[targ_id].dy && targ_id != 0 ) {
          aptr->targ[targ_id].dy = abs((long)dy_dalpha);
          aptr->targ[targ_id].pos.y = ya;
        } yb = sy - ( tanb * (sx - x) );
        dy_dbeta = ( ( 1+SQ(tanb) )*(x-sx) ) + tanb*dx_dbeta;
        if( abs((long)dy_dbeta) < aptr->targ[targ_id].dy  && targ_id != 0 ) {
          aptr->targ[targ_id].dy = abs((long)dy_dbeta);
          aptr->targ[targ_id].pos.y = yb;
        }
/*
printf("dx_da = %8.3lf  dy_da = %8.3lf  dx_db = %8.3lf  dy_db = %8.3lf\n"
    , dx_dalpha/1000, dy_dalpha/1000, dx_dbeta/1000, dy_dbeta/1000 );

*/
        Upd8_T_co();

coptr->x = x;
        coptr->y = yb;
        return 0;

}

/******************** Temporary function ****************************/
short Temp_GetAngle( short mode )
{
        if( mode==0 ) {              /* Return Primary angles */
          /* CAPSY at Prim BM, Ref target at Sec BM */
          A[3].a       = PRIM_INDEX;
          A[3].itarget = 0;
          A[5].a       = 251835+PRIM_INDEX;
          A[5].itarget = 1;
          A[1].a       = 300228+PRIM_INDEX;
          A[1].itarget = 2;
          A[4].a       = 14754+PRIM_INDEX;
          A[4].itarget = 3;
          A[2].a       = 62957+PRIM_INDEX;
          A[2].itarget = 4;
/******* Test values for S_targ_fnd screen ******/
/*
          A[5].itarget = 17;
```

```
 */
    A[6].itarget   = 7;
    A[7].itarget   = 12;
    A[8].itarget   = 6;
    A[9].itarget   = 10;
    A[10].itarget  = 11;
    A[11].itarget  = 15;
    A[12].itarget  = 13;
    A[13].itarget  = 20;
    A[14].itarget  = 16;
    A[15].itarget  = 19;
    A[16].itarget  = 5;
    A[17].itarget  = 8;
    A[18].itarget  = 9;
    A[19].itarget  = 14;
    A[20].itarget  = 18;

return 21;
} else if ( mode==1 )                              /* Return Secondary angles */
  if( SU_mode==2 ) {
    /* CAPSY at Sec BM, Ref. target at Prim BM */
    A[5].a          = 269006+SEC_INDEX;
    A[5].itarget    = 3;
    A[2].a          = SEC_INDEX;
    A[2].itarget    = 0;
    A[4].a          =  18828+SEC_INDEX;
    A[4].itarget    = 1;
    A[3].a          =  55316+SEC_INDEX;
    A[3].itarget    = 2;
    A[1].a          = 327589+SEC_INDEX;
    A[1].itarget    = 4;
    return 6;
  }
  else {
    /* CAPSY at Prim BM, Ref target at Int BM */
    A[5].a          = 348114+INDEX_3;
    A[5].itarget    = 2;
    A[1].a          =  62641+INDEX_3;
    A[1].itarget    = 3;
    A[2].a          = INDEX_3;
    A[2].itarget    = 0;
    A[3].a          = 110843+INDEX_3;
    A[3].itarget    = 4;
    A[4].a          = 299722+INDEX_3;
    A[4].itarget    = 1;
    return 6;
  } else if( mode==2 ) {
  /* CAPSY at Sec BM, Ref target at Int BM */
  A[5].a            = 320786+INDEX_4;
  A[5].itarget    = 1;
  A[1].a            = 210964+INDEX_4;
  A[1].itarget    = 3;
  A[2].a            = INDEX_4;
  A[2].itarget    = 0;
  A[3].a            = 269547+INDEX_4;
  A[3].itarget    = 4;
  A[4].a            = 357273+INDEX_4;
  A[4].itarget    = 2;
  return 6;
} else if( mode==3 ) {
  /* CAPSY at Sec BM, Ref target at Prim BM */
  A[5].a            = 327589+INDEX_5;
  A[5].itarget    = 4;
```

```
            A[1].a                 = 55316+INDEX_5;
            A[1].itarget    = 2;
            A[2].a                 = INDEX_5;
            A[2].itarget    = 0;
            A[3].a                 = 18828+INDEX_5;
            A[3].itarget    = 1;
            A[4].a                 = 269006+INDEX_5;
            A[4].itarget    = 3;
            return 6;
        } else if( mode==4 ) {
            /* CAPSY at Int BM, Ref target at Prim BM */
            A[5].a                 = INDEX_6;
            A[5].itarget    = 0;
            A[1].a                 =  91892+INDEX_6;
            A[1].itarget    = 2;
            A[2].a                 =  27228+INDEX_6;
            A[2].itarget    = 1;
            A[3].a                 = 334897+INDEX_6;
            A[3].itarget    = 4;
            A[4].a                 = 293694+INDEX_6;
            A[4].itarget    = 3;
            return 6;
        }

}

***************************************************************************
*/

/**************************************************************************
* All rights reserved, copyright (c) SP-Laserplane, Inc., 1992
*                 Unpublished Proprietary Information
*           Use requires license from SP-Laserplane, Inc.
*
***************************************************************************
*
*   FILE: stable.c
*
*   PURPOSE: Contains routines which will test all target angles acquired
*       during a set-up scan.  If they all remain in tolerance for a
*       minimal amount of time then the setup will be considered stable, the
*       angle values will be stored in a Scan structure and control is
*       passed to the next screen.
*
*   ENTRY POINTS:
*
***************************************************************************
*
*   INCLUDE FILES: cw.h
*
***************************************************************************
*
*   EXPORTED VARIABLES:
*
***************************************************************************
*
*   LOCALS:
*
***************************************************************************
*
*   C FUNCTIONS:
*           main:
*           entry point:
*           other:
*
***************************************************************************/ include       "capsy.h"
```

```
#define STBL_ANG_TOL    10      /* 0.010 degrees TOLERANCE for stab. test */
#define STBL_TICKS      240     /* Number of Ticks(62.5ms) for stab. test */
define TOTAL_RDGS      10      /* Number of readings be kept for average */ typedef struct stbl_type        tstbl;

struct stbl_type {
                /* Readings of targets during last scans */
        long    last_rdgs[TOTAL_RDGS];
        long    *rdg_ptr;       /* Pointers to Last_rdgs[] */
        long    base_ang;       /* Baseline angle (avg. of 1st 5 readings) */
        short   out_of_tol;     /* # of Times this target is out of tol. */
};

extern tscan Scan[];

/* test function in setup.c */
extern Temp_GetAngle();

extern short SU_step;

short Disp_stbl_scale(), Avg_rdgs(), Clr_stbl(), Stbl_test(), Chk_plcmnt(),
        Prn_plcmnt(), Chk_targs();

short Stable;                   /* When all stable conditions are met then
                                        Stable will be set to 1, otherwise 0 */
unsigned short Num_resets;      /* Number of Stbl_reset occurances */
short New_pos_fnd;              /* Flag to indicate if setup has been moved
                                        to the next position */
long Disp_ticks;                /* Number of 'Ticks' since Placement info.
                                        was put on the display */
long Stbl_ticks;                /* Number of 'Ticks' since reset */
tstbl Stbl[TARGETS+1];          /* One stable structure per target */
short Count;                    /* Number of times scanned since RESET */
short Stbl_reset;               /* If=1 :restarts stable test to 0 seconds */
tscan Tmpscan;                  /* Temporary scan structure */
short Scale;                    /* Number of asterisks shown on scale */
short Show_scale;       /* Set to one when Scale should be displayed */
short Disp_flag;        /* Set to one once a Scale has been displayed */
short int Ref_cnt;      /* # of times the Ref. target was found since reset */
short Auto_cont;        /* If one then the setup procedure was continued
                                automatically because of stable placement of the
                                Reference target */
long Tick_diff;         /* difference between Ticks and Stbl_ticks */
short int Last_beep;    /* stores Ref_cnt reading when last beeped */

/****************************************************************
* All rights reserved, copyright (c) SP-Laserplane, Inc., 1992
*               Unpublished Proprietary Information
*       Use requires license from SP-Laserplane, Inc.
****************************************************************
*
*  ROUTINE: Chk_stbl()
*  PURPOSE: Tests all acquired angles to remain within tolerance for
*       STBL_TICKS before angles are stored into the Scan. Updates the LCD
*       with the current Stbl_ticks/STABLE_TICKS scale. This scale keeps the
*       user informed as to the progress of the Scan acquisition.
*
*  INPUTS: none
*
*  OUTPUTS: Scale printed to the LCD.
*
****************************************************************/ short Chk_stbl( void )
{
        register short  i, j;
        short           id, ref_fnd = 0;
        tstbl           *s;

/* Easy way to avoid locking up if Ticks wraps around max. value */
```

```
          if( Stbl_ticks > Ticks )
            Stbl_reset = 1;

if( Stbl_reset == 1 ) {
            /*********** Reset variables ***********/
            Stbl_ticks = Ticks;
            Count = 0;
            Ref_cnt = 0;
            Last_beep = -1;
            Num_resets++;
            New_pos_fnd = 0;
            Clr_stbl( 1 );          /* Clears variables in stable structs */
/*
            if( Num_resets % 3 == 0   &&   Scrn != &S_targ_fnd )
*/
              /* Print Placement information to the display */
/*
              Prn_plcmnt();
*/

Stbl_reset = 0;
          }

Tick_diff = Ticks - Stbl_ticks;

/* Get angles */
          Tmpscan.tot = GetAngle() -1;

if( Tmpscan.tot > 0 )
            Count++;

for( i=0 ; i<Tmpscan.tot ; i++ ) {
            Tmpscan.ang[i] = A[i+1];

/****** Target #20 is temporarily the reference target *******/
          · if( Tmpscan.ang[i].itarget == 20 )
              Tmpscan.ang[i].itarget = A[i+1].itarget = 0;
            /************************************************************/

/* Was reference target found */
            if( Tmpscan.ang[i].itarget == 0 )
              ref_fnd = 1;
          }

/*
if( !(Count%10) ) {
  printf("\n\n" );
  for( i=0 ; i<Tmpscan.tot ; i++ ) {
    printf( " %2d- %7.3f     ", Tmpscan.ang[i].itarget, Tmpscan.ang[i].a/1000.0 )
    if( i+1%5 == 0 )
      printf("\n");
  }
}
*/
          /* Store angles from Tmpscan into the Last_rdgs array */
          for( i=0 ; i<Tmpscan.tot ; i++ ) {
            id = Tmpscan.ang[i].itarget;
            s = &Stbl[id];
            *(s->rdg_ptr) = Tmpscan.ang[i].a;

/* Increment rdg_ptr to next last_rdgs position */
            if( s->rdg_ptr == &s->last_rdgs[TOTAL_RDGS-1] )
              s->rdg_ptr = &s->last_rdgs[0];
            else
              s->rdg_ptr++;
          }

/* Get first five readings to establish reference angles */
```

```
          if( Count < 5   &&   ref_fnd == 1 )
            return 0;

else if( Count == 5 )
            Avg_rdgs( 0 );

else {
            Stbl_test();
            if( Ref_cnt == 0 ) {
              Stbl_reset = 1;
              return 0;
            }
            Chk_plcmnt();
          } if( Show_scale == 1  &&  Ticks-Disp_ticks >.64  &&  Ref_cnt > 2  &&
              (New_pos_fnd > 2  ||  SU_step == 0)   )
            Disp_stbl_scale();

/* short beep the audio every fifth time the reference is found */
          if( !(Ref_cnt%5)    &&   Ref_cnt != Last_beep ) {
              Beep( 2 );
              Last_beep = Ref_cnt;
          } return 0;

}

/*********************************************************************
* All rights reserved, copyright (c) SP-Laserplane, Inc., 1992
*                 Unpublished Proprietary Information
*          Use requires license from SP-Laserplane, Inc.
**********************************************************************
*
* ROUTINE: Prn_plcmnt()
* PURPOSE: Prints lines 0 to 2 of the current setup screen to the display
*        to remind the user where the ref. target and CAPSY should be.
*
* INPUTS: none
*
* OUTPUTS: Prints to the display
*
**********************************************************************/ short Prn_plcmnt( void )
{
        register short i;

Disp_ticks = Ticks;

/* Modify line3 label and fkey[3] */
        Cprintf( 3, 16, "       " );
        Scrn->f_key[3] = F_null;

Clr_lines( 0, 2 );
        for( i=0 ; i<3 ; i++ )
          Cprintf( i, 0, "%s", Scrn->stat[i] );

Bsend_psion();
        Disp_flag = 0;
        return 0;
}

/*********************************************************************
* All rights reserved, copyright (c) SP-Laserplane, Inc., 1992
*                 Unpublished Proprietary Information
*          Use requires license from SP-Laserplane, Inc.
**********************************************************************
```

```
*
*   ROUTINE: Stbl_test();
*   PURPOSE: Performs the tests to determine if the CAPSY has been stable
*       within tolerance for the specified amount of time.  When it has been
*       then the Stable variable will be set to 1.
*
*   INPUTS: none
*
*   OUTPUTS: none
*
***********************************************************************/ short Stbl_test( void )
{
        register short i;
        short   id, count;
        tstbl   *s;
        long    delta, sum, *lptr;

for( i=0 ; i<Tmpscan.tot ; i++ ) {
          id = Tmpscan.ang[i].itarget;
          /* Count the number of times the reference target was found */
          if( id == 0 )
             Ref_cnt++;
          s = &Stbl[id];
          delta = abs(Tmpscan.ang[i].a - s->base_ang);

if( s->base_ang != 999999 ) {
            if( delta > STBL_ANG_TOL )  /* Out of Tolerance ?? */
               s->out_of_tol++;
            else if( s->out_of_tol > 0 )
               s->out_of_tol--;
          }

/* look to acquire a base angle which may not have been acquired
             during the initial portion of the Acquisition process */
          else {
            count = sum = 0;
            lptr=&s->last_rdgs[0];
            while( *lptr != 999999      &&
                   lptr != &s->last_rdgs[TOTAL_RDGS] ) {
              count++;
              sum += *lptr;
              lptr++;
            }
            if( count > 4 )    /* If target seen at least five times */
               s->base_ang = sum / count;
          }

/* If out_of_tol has reached five then the setup is considered
             unstable so reset (Stbl_reset=1) */
          if(  s->out_of_tol > 4 ) {
            Stbl_reset = 1;
            break;
          }
        } if( Stbl_reset == 0   &&   Tick_diff >= STBL_TICKS
                &&    Stable == 0 ) {
          /* Look to see if Ref. target was found at least 20 times */
          if( Ref_cnt < 20 )
             Stbl_reset = 1;
          else {
             Stable = 1;             /* Stable conditions have been met */
             Avg_rdgs( 1 );
          }
        } return 0;
}
```

```
/*****************************************************************
 * All rights reserved, copyright (c) SP-Laserplane, Inc., 1992
 *              Unpublished Proprietary Information
 *          Use requires license from SP-Laserplane, Inc.
 *****************************************************************
 *
 * ROUTINE: Avg_rdgs()
 * PURPOSE: Computes the average of the angles in the last_rdgs[] of a
 *      stable structure.  If a 0 is passed then the average values will
 *      be put into the base_ang variable of the structure. Otherwise the
 *      average values will be put into the appropriate Scan[] which is
 *      determined by the SU_step variable.
 *
 * INPUTS: short mode : if 0 then put averages into Stbl[].base_ang
 *                      if 1 then put averages into Scan[].ang[]
 *
 * OUTPUTS: Puts average angles into appropriate structure
 *
 *****************************************************************/ short Avg_rdgs( short mode )
{
        register short   i, j;
        short            count, targ_fnd, num_fnd=0;
        long             sum, *lptr;
        tstbl            *s;

if( mode == 1 )         /* Clear out old Scan[] data */
          for( i=0 ; i<TARGETS+1 ; i++ ) {
            Scan[SU_step].ang[i].a = -1;
            Scan[SU_step].ang[i].itarget = -1;
          }
          for( j=0, s=&Stbl[0] ; j<TARGETS+1 ; j++, s++ ) {
            targ_fnd = 0;
            count = 0;
            sum = 0;
            for( i=0, lptr=&s->last_rdgs[0] ; i<TOTAL_RDGS ;
                  i++, lptr++ )
              if( *lptr == 999999 )
                break;
              else {
                sum += *lptr;
                count++;
                /* Test to see if target was found at least three times */
                if( count == 3 ) {
                  targ_fnd = 1;
                  num_fnd++;
                }
              }
            if( targ_fnd == 1 )
              if( mode == 0 ) {
                s->base_ang = sum / count;
                Stbl_ticks = Ticks;
                Tick_diff = 0;
              }
              else if( mode == 1 ) {
                Scan[SU_step].ang[num_fnd-1].a = 360000 - (sum / count);
                Scan[SU_step].ang[num_fnd-1].itarget = j;
              }
          } if( mode == 1 ) {
          /******** Audio *********/
          Beep( 32 );

Scan[SU_step].tot = num_fnd;
        }

Clr_stbl( mode );       /* Clears variables in stable structs */
```

```c
        return 0;
}

/*********************************************************************
* All rights reserved, copyright (c) SP-Laserplane, Inc., 1992
*                 Unpublished Proprietary Information
*          Use requires license from SP-Laserplane, Inc.
*********************************************************************
*
*  ROUTINE: Clr_stbl()
*  PURPOSE: Clears(resets) variables in all stable structs.
*
*  INPUTS: short mode : If mode = 0 then all but base_ang's will be cleared.
*                      If mode = 1 than all will be cleared.
*
*  OUTPUTS: none
*
*********************************************************************/ short Clr_stbl( short mode )
{
        register short   i, j;
        tstbl            *s;

/* Reset readings to an angle value which is outside of
           CAPSY's range ( > 360 deg.) and initialize pointers */
        for( j=0, s=&Stbl[0] ; j<TARGETS+1 ; j++, s++ ) {
          for( i=0 ; i<TOTAL_RDGS ; i++ )
             s->last_rdgs[i] = 999999;
          s->rdg_ptr = &s->last_rdgs[0];
          s->out_of_tol = 0;
          if( mode == 1 )
             s->base_ang = 999999;
        }
        return 0;
}

/*********************************************************************
* All rights reserved, copyright (c) SP-Laserplane, Inc., 1992
*                 Unpublished Proprietary Information
*          Use requires license from SP-Laserplane, Inc.
*********************************************************************
*
*  ROUTINE: Disp_stbl_scale()
*  PURPOSE: Displays the progress of a stability test during a setup.  A
*        scale of asterisks will be shown which will represent the ratio of
*        (time stable since last reset) / (time required to satisfy stable)
*        which is  (Ticks - Stbl_ticks) / (STBL_TICKS)
*
*  INPUTS: none
*
*  OUTPUTS: none
*
*********************************************************************/ short Disp_stbl_scale( void )
{
        register short i;
        short sc;

sc = ( (float)(Tick_diff) / STBL_TICKS ) * 20;

if( Disp_flag == 0 ) {
          /* Modify line3 label and fkey[3] */
          Cprintf( 3, 16, "PLCM" );
          Scrn->f_key[3] = Prn_plcmnt;

Clr_lines( 0, 2 );
```

```
        Cprintf( 0, 1, "ACQUISITION STATUS" );
        Cprintf( 1, 0, "Reset          Done" );
        for( i=0 ; i<=sc ; i++ )
          Cprintf( 2, i, "*" );
        Bsend_psion();

Scale = sc;
        Disp_flag = 1;
      }
      else if( sc != Scale ) {
        Scale = sc;
        Clr_lines( 2, 2 );
        for( i=0 ; i<sc ; i++ )
          Cprintf( 2, i, "*" );
        Bsend_psion();
      } return 0;
}

/****************************************************************
 * All rights reserved, copyright (c) SP-Laserplane, Inc., 1992
 *              Unpublished Proprietary Information
 *      Use requires license from SP-Laserplane, Inc.
 ****************************************************************
 *
 * ROUTINE: Chk_plcmnt()
 * PURPOSE: Used to determine if conditions have been met which would
 *      facilitate automatically proceeding to the next step in the Setup
 *      procedure.  If they have been met then Targ_fnd_cont() is called.
 *
 * INPUTS: none
 *
 * OUTPUTS: none
 *
 ****************************************************************/
short Chk_plcmnt( void )
{
        if( SU_step == 0 ) {   /* Chk_stbl() call initiated from Setup_1()
                                  function */
          /* Test to see if the Reference target has remained within
             tolerance for at least 5 seconds */
          if( Stbl[0].out_of_tol < 5   &&   Tick_diff > 80
              &&  Ref_cnt > 4 ) {
            Show_scale = 1;
            if( Auto_cont == 0 )
              Disp_flag = 0;
            Auto_cont = 1;
          }
        }

/* Chk_stbl() call initiated from Targ_fnd() function */
        /* Test to see if the Reference target has remained within tolerance
           for at least 2 seconds AND that it is in a new location at least
           two degrees from the last Scan ( Chk_targs() ) */
        else {
          if( New_pos_fnd < 3 )
            Chk_targs();

if( Stbl[0].out_of_tol < 5   &&   Tick_diff > 64   &&
              New_pos_fnd > 2   ) {
            Show_scale = 1;
            if( Auto_cont == 0 ) {
              Disp_flag = 0;
              Targ_fnd_cont();
            }
            Auto_cont = 1;
          }
```

```c
            if( Tick_diff > 48    &&    New_pos_fnd < 3    &&    Auto_cont == 0 ) {
                Stbl_reset = 1;
            }
        } if( Tick_diff > STBL_TICKS  &&   Stable == 0 ) {
            Stbl_reset = 1;
        } return 0;
}

/****************************************************************
 * All rights reserved, copyright (c) SP-Laserplane, Inc., 1992
 *              Unpublished Proprietary Information
 *         Use requires license from SP-Laserplane, Inc.
 ****************************************************************
 *
 * ROUTINE: Chk_targs()
 * PURPOSE: Checks position of targets to see if the Reference target is
 *      now in a new position relative to the position of the last scan.
 *
 * INPUTS: none
 *
 * OUTPUTS: none
 *
 ****************************************************************/ short Chk_targs( void )
{
        register short  i, j;
        short           targ_fnd=0, same_pos=0;
        tangle          ref_ang, test_ang, scan_ref, scan_test;
        long          . ang_diff, scan_diff, diff;

ref_ang.a = 999999;
        /* Get Reference angle */
        for( i=0 ; i<Tmpscan.tot ; i++ )
          if( Tmpscan.ang[i].itarget == 0 ) {
            ref_ang = Tmpscan.ang[i];
            break;
          } if( ref_ang.a == 999999 )         /* Ref. target not seen in scan */
          return 0;

/* look for relative angle change between Ref. and other target */
        j = 0;
        while( targ_fnd == 0    &&    j<Tmpscan.tot ) {
          if( Tmpscan.ang[j].itarget == 0 ) {
            j++;
            continue;
          }
          else
            test_ang = Tmpscan.ang[j];
          /* look for test_ang target found in last scan */
          /* Note: routine is not called when SU_step < 1 */
          for( i=0 ; i<Scan[SU_step-1].tot ; i++ )
            if( Scan[SU_step-1].ang[i].itarget == test_ang.itarget ) {
              scan_test = Scan[SU_step-1].ang[i];
              targ_fnd = 1;
            }
            else if( Scan[SU_step-1].ang[i].itarget == 0 )       /* Ref targ */
              scan_ref = Scan[SU_step-1].ang[i];
          if( j == Tmpscan.tot-1  &&  targ_fnd == 0 )
            return 0;

j++;
        }
```

```
      if( targ_fnd == 1 ) {
        ang_diff = abs( ref_ang.a - test_ang.a );
        scan_diff = abs( scan_ref.a - scan_test.a );

diff = abs( ang_diff - scan_diff );

/* Check to see if Reference target has moved more than two degrees
            relative to the test target */
        /* Note: second test is to test for situation where either ang_diff
            or scan_diff angles were on opposite sides of the index */
        if( diff < 2000   ||   abs(360000-(ang_diff+scan_diff)) < 2000 )
          same_pos = 1;

if( same_pos == 0 ) {
          New_pos_fnd++;
        }
        else if( New_pos_fnd > 0 )
          New_pos_fnd--;

}
      return 0;
}
```

```
/*****************************************************************************
*/

/*****************************************************************************
* All rights reserved, copyright (c) SP-Laserplane, Inc., 1992
*                 Unpublished Proprietary Information
*          Use requires license from SP-Laserplane, Inc.
*
******************************************************************************
*
*   FILE: scrndef.c
*
*   PURPOSE: Contains functions to define and initialize the scrn_type
*        structures used in the shell program.
*
*   ENTRY POINTS: Scrn_def(), Init_scrn(), Init_prev_scrn(),
*                 Init_scroll_scrn()
*
******************************************************************************
*
*   INCLUDE FILES: cw.h            setup.h
*
******************************************************************************
*
*   EXPORTED VARIABLES: All Screen structure definitions "S_..."
*
******************************************************************************
*
*   LOCALS:
*
******************************************************************************
*
*   C FUNCTIONS:
*              main:     Scrn_def()
*              entry point:    Scrn_def(), Init_scrn(), Init_prev_scrn(),
*                              Init_scroll_scrn()
*              other:    Store_text()
*
*****************************************************************************/ include    "capsy.h"

/ Screen pointers and screens /
scrn_lst *Scrn, *Prev_scrn[4], *Next_scrn, S_lcd_test, S_owner, S_welcome,
    S_seller, S_testing, S_test_comp, S_tape_meas, S_xy_meas, /*S_targ_loc,
    S_area_calc, S_bmark_find, S_ctr_find, S_curves, S_angles,*/
```

```
                S_meas_menu, S_zero_dist, S_hold_dist, S_hold_xy, S_setup_menu,
                S_area_opt, S_hware_set,/*S_download, S_secur_set, S_lang,*/S_batt,
                S_audio, S_units, /*S_secur_act, S_remove_key,*/ S_undef, S_contrast,
                S_sel_area, S_sel_no_area, S_add_area, S_add_max_area, S_del_area,
                S_del_no_area, S_del_area_sure, S_bmark_opt, S_sel_prim_bm,
                S_sel_sec_bm, S_cal_mode, S_2bm_setup, S_setup_1, S_setup_2,
                S_setup_3, S_setup_4, S_setup_5, S_targ_fnd, S_setup_again,
                S_add_max_bm, S_add_bm_id, S_add_bm_x, S_add_bm_y, S_add_bm_vrfy,
                S_del_bm, S_del_no_bm, S_del_bm_sure, S_dupl_area_id, S_sel_prim_bm,
                S_sel_sec_bm, S_too_few_bm, S_end, S_version, S_sel_targs,
                S_add_targ, S_del_targ, S_show_targs, S_del_targ_sure,
                S_all_targs_actv, S_no_targs_actv, S_su_no_targs, S_su_show_targs,
                S_targs_known;

/**************************************/
extern short int Prn_targs();
/**************************************/ char lin[2][21];        /* storage for prev. screen text for lines 1 and 2 */
        char line_3[20];

short int Run_flag;     /* Flag used so that primary function can run only */
                                /*   one time or at some other interval            */
                                /* RESET to zero whenever a screen is initialized  */

/****************************************************************
* All rights reserved, copyright (c) SP-Laserplane, Inc., 1992
*              Unpublished Proprietary Information
*        Use requires license from SP-Laserplane, Inc.
****************************************************************
*
*   ROUTINE: Init_scrn()
*   PURPOSE: Initializes a new screen list structure WITHOUT resetting
*        Scrn->linenum and Scrn->menu_top to zero.
*
*   INPUTS: new_scrn = address of Screen to initialize
*
*   OUTPUTS: none
*
****************************************************************/ short int Init_scrn( scrn_lst *new_scrn )
{
        register short i;

/* Pointers to previous screens, only needed for some functions */
        for( i=3 ; i>0 ; i-- )
           Prev_scrn[i] = Prev_scrn[i-1];

Prev_scrn[0] = Scrn;

Scrn = new_scrn;

/* These two screens are simply menu selection screens that */
        /*   should always start at the top */
        if( Scrn == &S_meas_menu || Scrn == &S_setup_menu )
           Scrn->menu_top = Scrn->linenum = 0;

Print_line3();
        if( Scrn->menu_top != -1 ) {            /* menu screen */
           Print_menu();
           Print_cursor();
        }
        else
           Print_stat();                        /* data_screen - print template */

Bsend_psion();

Run_flag = 1;
        ( *Scrn->func )();                      /* primary screen function */
```

```
            return 0;
}
/******************************************************************
* All rights reserved, copyright (c) SP-Laserplane, Inc., 1992
*                  Unpublished Proprietary Information
*           Use requires license from SP-Laserplane, Inc.
*******************************************************************
*
*  ROUTINE: Init_prev_scrn()
*  PURPOSE: Initializes the screen list structure which is pointed to by
*       Prev_scrn WITHOUT resetting Scrn->linenum and Scrn->menu_top to zero.
*
*  INPUTS: new_scrn = address of Screen to initialize
*
*  OUTPUTS: none
*
*******************************************************************/ short int Init_prev_scrn( void )
{
        register short i;

/* Pointers to previous screens, only needed for some functions */
        for( i=3 ; i>0 ; i-- )
          Prev_scrn[i] = Prev_scrn[i-1];

Scrn = Prev_scrn[0];
        Prev_scrn[0] = Scrn;

Print_line3();
        if( Scrn->menu_top != -1 ) {             /* menu screen */
          Print_menu();
          Print_cursor();
        }
        else
          Print_stat();                          /* data_screen - print template */

Bsend_psion();

Run_flag = 1;
        ( *Scrn->func )();                       /* primary screen function */
        return 0;
}

/******************************************************************
* All rights reserved, copyright (c) SP-Laserplane, Inc., 1992
*                  Unpublished Proprietary Information
*           Use requires license from SP-Laserplane, Inc.
*******************************************************************
*
*  ROUTINE: Scrn_def()
*  PURPOSE: Defines variables for each screen list
*
*  INPUTS: none
*
*  OUTPUTS: none
*
*******************************************************************/ short int Scrn_def( void )
{
        line_lst *lineptr;
/******************************************************************/
/***************** PARTIAL LISTING OF THIS FUNCTION ****************/
/******************************************************************/
........
.....
...
```

```c
/******************** S_cal_mode screen *************************/ strcpy( S_cal_mode.stat[0], "  Run CAPSY Set-up" );
        strcpy( S_cal_mode.stat[1], "with two benchmarks" );
        strcpy( S_cal_mode.stat[2], "     or three ?" );
        strcpy( S_cal_mode.line3, "CANC       2    3" );

S_cal_mode.func    = F_null;
        S_cal_mode.f_key[0] = Bmark_opt_init;
        S_cal_mode.f_key[1] = F_null;
        S_cal_mode.f_key[2] = Entr_2bm_mode;
        S_cal_mode.f_key[3] = Entr_3bm_mode;
        S_cal_mode.f_key[4] = F_null;
        S_cal_mode.a_rpt   = 0;          /* no key repeating */

S_cal_mode.menu_top = -1;
        /* no linked list */

/******************** S_targ_fnd screen *************************/ strcpy( S_targ_fnd.stat[0], "Targets found :" );
        S_targ_fnd.stat[1][0] = '\0';
        S_targ_fnd.stat[2][0] = '\0';
        strcpy( S_targ_fnd.line3, "              CONT" );

S_targ_fnd.func    = Targ_fnd;
        S_targ_fnd.f_key[0] = F_null;
        S_targ_fnd.f_key[1] = F_null;
        S_targ_fnd.f_key[2] = F_null;
        S_targ_fnd.f_key[3] = Targ_fnd_cont_sw;
        S_targ_fnd.f_key[4] = F_null;
        S_targ_fnd.a_rpt   = 0;          /* no key repeating */

S_targ_fnd.menu_top = -1;
        /* no linked list */

/******************** S_setup_1 screen *************************/ strcpy( S_setup_1.stat[0], "Initial Placement :" );
        strcpy( S_setup_1.stat[1], " CAPSY  -> Prim. BM" );
        strcpy( S_setup_1.stat[2], " Ref.   -> Sec. BM" );
        strcpy( S_setup_1.line3, "CANC             " );

S_setup_1.func    = Setup_1;
        S_setup_1.f_key[0] = Bmark_opt_init;
        S_setup_1.f_key[1] = F_null;
        S_setup_1.f_key[2] = F_null;
        S_setup_1.f_key[3] = F_null;
        S_setup_1.f_key[4] = F_null;
        S_setup_1.a_rpt   = 0;          /* no key repeating */

S_setup_1.menu_top = -1;
        /* no linked list */

/******************** S_2bm_setup screen *************************/ strcpy( S_2bm_setup.stat[0], "Change Placement to:" );
        strcpy( S_2bm_setup.stat[1], " CAPSY  -> Sec. BM" );
        strcpy( S_2bm_setup.stat[2], " Ref.   -> Prim. BM" );
        strcpy( S_2bm_setup.line3, "CANC             " );

S_2bm_setup.func    = Two_bm_setup;
        S_2bm_setup.f_key[0] = Bmark_opt_init;
        S_2bm_setup.f_key[1] = F_null;
        S_2bm_setup.f_key[2] = F_null;
        S_2bm_setup.f_key[3] = F_null;
        S_2bm_setup.f_key[4] = F_null;
        S_2bm_setup.a_rpt   = 0;          /* no key repeating */
```

```
        S_2bm_setup.menu_top = -1;
        /* no linked list */

/********************* S_setup_2 screen ************************/ strcpy( S_setup_2.stat[0], "Move Ref. target to" );
        strcpy( S_setup_2.stat[1], " Intermediate BM" );
        strcpy( S_setup_2.stat[2], "(CAPSY -> Prim. BM)" );
        strcpy( S_setup_2.line3, "CANC              " );

S_setup_2.func = Setup_2;
        S_setup_2.f_key[0] = Bmark_opt_init;
        S_setup_2.f_key[1] = F_null;
        S_setup_2.f_key[2] = F_null;
        S_setup_2.f_key[3] = F_null;
        S_setup_2.f_key[4] = F_null;
        S_setup_2.a_rpt    = 0;          /* no key repeating */

S_setup_2.menu_top = -1;
        /* no linked list */

/********************* S_setup_3 screen ************************/ strcpy( S_setup_3.stat[0], "   Move CAPSY to" );
        strcpy( S_setup_3.stat[1], "    Secondary BM" );
        strcpy( S_setup_3.stat[2], "   (Ref. -> Int. BM)" );
        strcpy( S_setup_3.line3, "CANC              " );

S_setup_3.func = Setup_3;
        S_setup_3.f_key[0] = Bmark_opt_init;
        S_setup_3.f_key[1] = F_null;
        S_setup_3.f_key[2] = F_null;
        S_setup_3.f_key[3] = F_null;
        S_setup_3.f_key[4] = F_null;
        S_setup_3.a_rpt    = 0;          /* no key repeating */

S_setup_3.menu_top = -1;
        /* no linked list */

/********************* S_setup_4 screen ************************/ strcpy( S_setup_4.stat[0], "Move Ref. target to" );
        strcpy( S_setup_4.stat[1], "     Primary BM" );
        strcpy( S_setup_4.stat[2], " (CAPSY -> Sec. BM)" );
        strcpy( S_setup_4.line3, "CANC              " );

S_setup_4.func = Setup_4;
        S_setup_4.f_key[0] = Bmark_opt_init;
        S_setup_4.f_key[1] = F_null;
        S_setup_4.f_key[2] = F_null;
        S_setup_4.f_key[3] = F_null;
        S_setup_4.f_key[4] = F_null;
        S_setup_4.a_rpt    = 0;          /* no key repeating */

S_setup_4.menu_top = -1;
        /* no linked list */

/********************* S_setup_5 screen ************************/ strcpy( S_setup_5.stat[0], "  Move CAPSY to" );
        strcpy( S_setup_5.stat[1], " Intermediate BM" );
        strcpy( S_setup_5.stat[2], " (Ref. -> Prim. BM)" );
        strcpy( S_setup_5.line3, "CANC              " );

S_setup_5.func = Setup_5;
        S_setup_5.f_key[0] = Bmark_opt_init;
        S_setup_5.f_key[1] = F_null;
        S_setup_5.f_key[2] = F_null;
        S_setup_5.f_key[3] = F_null;
```

```
        S_setup_5.f_key[4]  = F_null;
        S_setup_5.a_rpt     = 0;            /* no key repeating */

S_setup_5.menu_top = -1;
        /* no linked list */

/********************* S_setup_again screen **************************/ strcpy( S_setup_again.stat[0], " Would you like to" );
        strcpy( S_setup_again.stat[1], "  run Set-up again" );
        strcpy( S_setup_again.stat[2], "  with other BM's ?" );
        strcpy( S_setup_again.line3,   " NO             YES" );

S_setup_again.func     = F_null;
        S_setup_again.f_key[0] = Mode;
        S_setup_again.f_key[1] = F_null;
        S_setup_again.f_key[2] = F_null;
        S_setup_again.f_key[3] = Init_sel_prim_bm;
        S_setup_again.f_key[4] = F_null;
        S_setup_again.a_rpt    = 0;          /* no key repeating */

S_setup_again.menu_top = -1;
        /* no linked list */

...
    .....
    .......

return 0;
}
```

Having thus described the method and system for determining the position of at least one retroreflective element of the present invention in detail and by reference to preferred embodiments thereof, it will be apparent that modifications and variations are possible without departing from the scope of the invention defined in tee appended claims.

What is claimed is:

1. A method for determining the position of at least one position retroreflective element located in a predetermined coordinate frame of reference having an X axis, said method comprising the steps of:

(a) providing a light transmitting and detecting means for transmitting a rotating beam of light, detecting reflections of said beam of light, and providing an index position along said rotation of said beam of light;

(b) providing a reference retroreflective element capable of reflecting said beam of light back toward said light transmitting and detecting means;

(c) positioning said light transmitting and detecting means at a primary benchmark position at known first coordinates in said coordinate frame of reference;

(d) positioning said reference retroreflective element at a secondary benchmark position at known second coordinates in said coordinate frame of reference;

(e) transmitting said beam of light to illuminate said at least one position retroreflective element and said reference retroreflective element during a first rotation of said beam of light;

(f) monitoring said first rotation of said beam of light as it travels between said index position, said at least one position retroreflective element and reference retroreflective element;

(g) repositioning said light transmitting and detecting means at said second benchmark position and said reference retroreflective element at said primary benchmark position;

(h) transmitting said beam of light to illuminate said at least one position retroreflective element and said reference retroreflective element during a second rotation of said beam of light;

(i) monitoring said second rotation of said beam of light as it travels between said index position, said at least one position retroreflective element and said reference retroreflective element; and (j) determining the position of said at least one position retroreflective element in said coordinate system based on said first coordinates, said second coordinates, said first and second rotations of said beam of light and said reference position.

2. The method for determining the position of at least one position retroreflective element as claimed in claim 1 wherein said step of providing a light transmitting and detecting means includes the step of:

providing a light transmitting and detecting means for providing a reference position parallel to said X axis irrespective of the orientation of said light transmitting and detecting means; and said step of determining the position of said at least one position retroreflective element includes the step of referencing said first and second rotations of said beam of light to said reference position.

3. The method for determining the position of at least one position retroreflective element as claimed in claim 1 wherein said step of monitoring said first rotation of said beam of light and said step of monitoring said second rotation of said beam of light further include the steps of:

mounting a member on a rotating shaft, said member having a periphery and further having a plurality of apertures located at said periphery which divide a revolution of said member into a plurality of generally equal partial revolutions; and registering a time differential between each adjacent pair of said plurality of apertures as said member rotates.

4. The method for determining the position of at least one position retroreflective element as claimed in claim 3 further including the step of interpolating between said each adjacent pair of said plurality of apertures to determine exact angles between each of said adjacent pair of said plurality of apertures.

5. The method for determining the position of at least one position retroreflective element as claimed in claim 2 wherein said step of determining the position of said at least one position retroreflective element further includes the steps of:

determining a first benchmark angle between said at least one position retroreflective element and said reference position based on said first rotation of said beam of light;

determining a second benchmark angle between said retroreflective element and said reference position based on said second rotation of said beam of light; and determining a X-coordinate value for said retroreflective element based on said first and second coordinates and said first and second benchmark angles.

6. The method for determining the position of at least one position retroreflective element as claimed in claim 5 wherein said step of determining a X-coordinate value for said at least one retroreflective element comprises the step of solving the following equation:

$$X = \frac{SY - (\tan(\beta 1)) * (SX) - PY + (\tan(\alpha 1)) * (PX)}{\tan(\alpha 1) - \tan(\beta 1)}$$

wherein:
SX and SY are the X and Y coordinate values of said second coordinates, respectively;
PX and PY are the X and Y coordinate values of said first coordinates, respectively;
$\alpha 1$ is said first benchmark angle; and
$\beta 1$ is said second benchmark angle.

7. A method for determining the position of at least one position retroreflective element located in a predetermined coordinate frame of reference having an X axis, said method comprising the steps of:

(a) providing a light transmitting and detecting means for transmitting a rotating beam of light, detecting reflections of said beam of light, providing an index position along said rotation of said beam of light;

(b) providing a reference retroreflective element capable of reflecting said beam of light back toward said light transmitting and detecting means;

(c) providing an intermediate benchmark position located at third coordinates;

(d) positioning said light transmitting and detecting means at a primary benchmark position at known first coordinates in said coordinate frame of reference;

(e) positioning said reference retroreflective element at a secondary benchmark position at known second coordinates in said coordinate frame of reference;

(f) transmitting said beam of light to illuminate said at least one position retroreflective element and said reference retroreflective element during a first rotation of said beam of light;

(g) monitoring said first rotation of said beam of light as it travels between said index position, said at least one position retroreflective element and said reference retroreflective element;

(h) repositioning said reference retroreflective element at said intermediate benchmark position;

(i) transmitting said beam of light to illuminate said at least one position retroreflective element and said reference retroreflective element during a second rotation of said beam of light;

(i) monitoring said second rotation of said beam of light as it travels between said index position, said at least one position retroreflective element and said reference retroreflective element;

(j) repositioning said light transmitting and detecting means at said secondary benchmark position;

(k) transmitting said beam of light to illuminate said at least one position retroreflective element and said reference retroreflective element during a third rotation of said beam of light;

(l) monitoring said third rotation of said beam of light as it travels between said index position, said at least one position retroreflective element and said reference retroreflective element;

(m) repositioning said reference retroreflective element at said primary benchmark position;

(n) transmitting said beam of light to illuminate said at least one position retroreflective element and said reference retroreflective element during a fourth rotation of said beam of light;

(o) monitoring said fourth rotation of said beam of light as it travels between said index position, said at least one position retroreflective element and said reference retroreflective element;

(p) repositioning said light transmitting and detecting means at said intermediate benchmark position;

(q) transmitting said beam of light to illuminate said at least one position retroreflective element and said reference retroreflective element during a fifth rotation of said beam of light;

(r) monitoring said fifth rotation of said beam of light as it travels between said index position, said at least one position retroreflective element and said reference retroreflective element; and (s) determining the position of said at least one position retroreflective element in said coordinate system based on said first, second and third coordinates and at least two of said first, second, third, fourth, and fifth rotations of said beam of light.

8. The method for determining the position of at least one position retroreflective element as claimed in claim 7 wherein said step of providing a light transmitting and detecting means includes the step of:

providing a light transmitting and detecting means capable of indicating a reference position parallel to said X axis irrespective of the orientation of said light transmitting and detecting means; and said step of determining the position of said at least one position retroreflective element includes the step of referencing said first, second, third, fourth and fifth rotations of said beam of light to said reference position.

9. The method for determining the position of at least one position retroreflective element as claimed in claim 6 wherein said steps of monitoring said first, second, third, fourth, and fifth rotations of said beam of light further include the steps of:

mounting a member on a rotating shaft, said member having a periphery and further having a plurality of apertures located at said periphery which divide a revolution of said member into a plurality of generally equal partial revolutions; and registering a time differential between each adjacent pair of said plurality of apertures as said member rotates.

10. The method for determining the position of at least one position retroreflective element as claimed in claim 7 wherein said step of determining the position of said at least one position retroreflective element includes the steps of:

(t) calculating a X coordinate value and a Y coordinate value for said at least one position retroreflective element based on said reference position, said first, second and third coordinates and at least two of said first, second, third, fourth and fifth rotation of said beam of light;

(u) setting a maximum X derivative value;

(v) setting a maximum Y derivative value;

(x) calculating a derivative of said calculated X coordinate value to produce a X derivative value;

(y) calculating a derivative of said calculated Y coordinate value to produce a Y derivative value;

(z) comparing said X derivative value to said maximum X derivative value;

(aa) comparing said Y derivative value to said maximum Y derivative value;

(bb) using said calculated X coordinate value as said X coordinate of said at least one position retroreflective element if said X derivative value is less than said maximum X derivative value;

(cc) using said calculated Y coordinate value as said Y coordinate of said at least one position retroreflective element if said Y derivative value is less than said maximum Y derivative value;

(dd) repeating steps (t) through (cc) using said at least two of said first, second, third, fourth and fifth rotation of said beam of light until a X derivative value and a Y derivative value are less than said maximum X derivative value and said maximum Y derivative value respectively.

11. The method for determining the position of at least one position retroreflective element as claimed in claim 7 wherein said step of determining the position of said at least one position retroreflective element includes the steps of:

calculating at least two X coordinate values and at least two Y coordinate values for said at least one position retroreflective element based on said reference position, said first, second and third coordinates and said first, second, third, fourth and fifth rotation of said beam of light;

comparing said at least two X coordinate values to determine a most accurate X coordinate value;

comparing said at least two Y coordinate values to determine a most accurate Y coordinate value; and using said most accurate X coordinate value and said most accurate Y coordinate value as said coordinates of said at least one position retroreflective element.

12. The method for determining the position of at least one position retroreflective element as claimed in claim 11 wherein said step of comparing said at least two sets of coordinate values and said step of comparing said at least two Y coordinate values includes the step of taking derivatives of each of said at least two X and Y coordinate values.

13. The method for determining the position of at least one position retroreflective element as claimed in claim 7 wherein said step of providing an intermediate benchmark position located at third coordinates include the step of using said light transmitting and detecting means, said reference retroreflective element and said at least one position retroreflective element to determine said third coordinates.

14. A method for initializing a position sensing system capable of determining the position of a point in a predetermined coordinate frame of reference having an X axis, said position sensing system having a light transmitting and detecting means for transmitting a rotating beam of light, for detecting reflections of said beam of light, for providing an index position along said rotation of said beam of light, and for providing a reference position which is parallel to said X axis irrespective of said orientation of said light transmitting and detecting means, said method comprising the steps of:

(a) providing a reference retroreflective element capable of reflecting said beam of light back toward said light transmitting and detecting means;

(b) positioning said light transmitting and detecting means at a primary benchmark position at known first coordinates in said coordinate frame of reference;

(c) positioning said reference retroreflective element at a secondary benchmark position at known second coordinates in said coordinate frame of reference;

(d) transmitting said beam of light to illuminate said at least one position retroreflective element and said reference retroreflective element during a first rotation of said beam of light;

(e) measuring, during said first rotation of said beam of light, a first angle of rotation of said beam as it travels from said index position to said at least one retroreflective element, and a second angle of rotation of said beam as it travels from said index position to said reference retroreflective element;

(f) repositioning said light transmitting and detecting means at said secondary benchmark position and said reference retroreflective element at said primary benchmark position;

(g) transmitting said beam of light to illuminate said at least one position retroreflective element and said reference retroreflective element during a second rotation of said beam of light;

(h) measuring, during said second rotation of said beam of light, a third angle of rotation of said beam of light as it travels from said index position to said at least one position retroreflective element, and a fourth angle of rotation of said beam of light as it travels from said index position to said reference retroreflective element; and (i) determining the position of said at least one position retroreflective element based on said first coordinates, said second coordinates and said first, second, third and fourth angles of rotation of said beam of light; and (j) using the position of said at least one position retroreflective element to determine the position of a point in said coordinate frame of reference.

15. The method for initializing a position sensing system as claimed in claim 14 wherein said step of determining the position of said at least one position retroreflective element comprises the steps of:
- determining a first benchmark angle between said at least one position retroreflective element and said reference position based on said first and second angles of rotation of said beam of light;
- determining a second benchmark angle between said at least one position retroreflective element and said reference position based on said third and fourth angles of rotation of said beam of light; and
- determining a X-coordinate value for said at least one position retroreflective element based on said first and second coordinates and said first and second benchmark angles.

16. The method for initializing a position sensing system as claimed in claim 15 wherein said step of determining the position of said at least one position retroreflective element includes the step of translating said first, second, third and fourth angles of rotation of said beam of light to be referenced to said reference position.

17. The method for initializing a position sensing system as claimed in claim 14 wherein said step of determining a X-coordinate value for said at least one position retroreflective element comprises the step of solving the following equation:

$$X = \frac{SY - (\tan(\beta 1)) * (SX) - PY + (\tan(\alpha 1)) * (PX)}{\tan(\alpha 1) - \tan(\beta 1)}$$

wherein:
- SX and SY are the X and Y coordinate values of said second coordinates, respectively;
- PX and PY are the X and Y coordinate values of said first coordinates, respectively;
- $\alpha 1$ is said first benchmark angle; and
- $\beta 1$ is said second benchmark angle.

18. The method for initializing a position sensing system as claimed in claim 14 wherein said steps of measuring a first, second, third and fourth angle comprise the steps of:
- mounting a member on a rotating shaft, said member having a periphery and further having a plurality of apertures located at said periphery which divide a revolution of said member into a plurality of generally equal partial revolutions; and
- registering a time differential between each adjacent pair of said plurality of apertures as said member rotates.

19. The method for initializing a position sensing system as claimed in claim 18 further comprising the step of interpolating between said each adjacent pair of said plurality of apertures to determine exact angles between each of said adjacent pair of said plurality of apertures.

20. A system for determining the position of at least one position retroreflective element in a predetermined coordinate frame of reference having an X axis, said system comprising:
- light transmitting and detecting means, positionable at one of a primary benchmark position and a secondary benchmark position, for generating a rotating beam of light, for providing an index position along said rotation of said beam of light, for providing a reference position parallel to said X axis irrespective of the orientation of said light transmitting and detecting means and for detecting reflections of said beam of light from a reference retroreflective element positioned at the other of said primary and secondary benchmark positions and said at least one position retroreflective element, for generating a plurality of first signals in response to said reflections of said beam of light when said light transmitting and detecting means is located at said primary benchmark position and for generating a plurality of second signals in response to said reflections of said beam of light when said light transmitting and detecting means is located at said secondary benchmark position; and
- computer means for computing said position of said at least one position retroreflective element in said frame of reference from said reference position, said plurality of first signals, said plurality of second signals and said known first and second coordinates of said primary and secondary benchmark positions.

21. The system as claimed in claim 20 wherein said position retroreflective element includes an identification means thereon for reflecting light which includes information generated by said identification means for uniquely identifying said position retroreflective element.

22. The system as claimed in claim 19 wherein said light transmitting and detecting means comprises:
- means for generating a beam of light;
- means for projecting said beam of light at a substantially constant rotating angular velocity toward said at least one position retroreflective element and said reference retroreflective element;
- means for receiving said beam of light reflected from said at least one position retroreflective element and said reference retroreflective element corresponding to said illumination of each of said retroreflective elements during said rotation of said beam; and
- means for transmitting a plurality of angle signals indicative of a plurality of angles at which said means for receiving said beam of light is positioned with respect to said index position, said at least one position retroreflective element and said reference retroreflective element.

23. The system as claimed in claim 22 wherein said means for transmitting a plurality of angle signals comprises:
- a member rotating with said beam, said member having a periphery and further having a plurality of angularly positioned elements spaced around said periphery which divide a revolution of said member into a plurality of generally equal partial revolutions; and
- means for detecting movement of each of said elements past a predetermined point as said member rotates and generating said plurality of angle signals.

* * * * *